(12) United States Patent
Krasser et al.

(10) Patent No.: US 11,811,821 B2
(45) Date of Patent: Nov. 7, 2023

(54) VALIDATION-BASED DETERMINATION OF COMPUTATIONAL MODELS

(71) Applicant: CrowdStrike, Inc., Sunnyvale, CA (US)

(72) Inventors: Sven Krasser, Los Angeles, CA (US); David Elkind, Arlington, VA (US); Brett Meyer, Alpharetta, GA (US); Patrick Crenshaw, Atlanta, GA (US)

(73) Assignee: CrowdStrike, Inc., Sunnyvale, CA (US)

( * ) Notice: Subject to any disclaimer, the term of this patent is extended or adjusted under 35 U.S.C. 154(b) by 245 days.

(21) Appl. No.: 17/087,194

(22) Filed: Nov. 2, 2020

(65) Prior Publication Data
US 2021/0075798 A1 Mar. 11, 2021

Related U.S. Application Data

(62) Division of application No. 15/402,503, filed on Jan. 10, 2017, now Pat. No. 10,826,934.

(51) Int. Cl.
*H04L 9/40* (2022.01)
*G06N 20/00* (2019.01)
*G06F 21/56* (2013.01)

(52) U.S. Cl.
CPC ............ *H04L 63/145* (2013.01); *G06F 21/56* (2013.01); *G06N 20/00* (2019.01); *H04L 63/1416* (2013.01)

(58) Field of Classification Search
CPC ... H04L 63/145; H04L 63/1416; G06N 20/00; G06F 21/56
See application file for complete search history.

(56) References Cited

U.S. PATENT DOCUMENTS

| 8,925,087 | B1 ‡ | 12/2014 | Oliver | H04L 51/12 726/24 |
| 9,960,975 | B1 ‡ | 5/2018 | Van Horenbeeck | H04L 63/1416 |
| 10,437,854 | B2 * | 10/2019 | Gabrys | G06F 16/273 |

(Continued)

OTHER PUBLICATIONS

The Extended European Search Report dated Mar. 19, 2018 for European Patent Application No. 18150963.9, 10 pages.‡

(Continued)

*Primary Examiner* — Michael R Vaughan
(74) *Attorney, Agent, or Firm* — Lee & Hayes, P.C.

(57) ABSTRACT

Example techniques described herein determine a validation dataset, determine a computational model using the validation dataset, or determine a signature or classification of a data stream such as a file. The classification can indicate whether the data stream is associated with malware. A processing unit can determine signatures of individual training data streams. The processing unit can determine, based at least in part on the signatures and a predetermined difference criterion, a training set and a validation set of the training data streams. The processing unit can determine a computational model based at least in part on the training set. The processing unit can then operate the computational model based at least in part on a trial data stream to provide a trial model output. Some examples include determining the validation set based at least in part on the training set and the predetermined criterion for difference between data streams.

20 Claims, 12 Drawing Sheets

(56) References Cited

U.S. PATENT DOCUMENTS

| | | | |
|---|---|---|---|
| 11,263,556 B2* | 3/2022 | Johnson | G06N 20/00 |
| 2011/0041179 A1* | 2/2011 | Ståhlberg | G06F 21/566 |
| | | | 726/23 |
| 2011/0078099 A1‡ | 3/2011 | Weston | G06K 9/6231 |
| | | | 706/12 |
| 2012/0317644 A1‡ | 12/2012 | Kumar | G06F 21/566 |
| | | | 726/24 |
| 2014/0052674 A1‡ | 2/2014 | Aggarwal | G06F 16/353 |
| | | | 706/12 |
| 2015/0007319 A1‡ | 1/2015 | Antonov | G06F 21/56 |
| | | | 726/23 |
| 2015/0067833 A1* | 3/2015 | Verma | H04L 63/1483 |
| | | | 726/22 |
| 2015/0128263 A1‡ | 5/2015 | Raugas | H04L 63/1408 |
| | | | 726/23 |
| 2016/0306971 A1‡ | 10/2016 | Anderson | G06F 21/563 |
| 2016/0307113 A1‡ | 10/2016 | Calapodescu | G06N 20/00 |
| 2018/0027004 A1‡ | 1/2018 | Huang | H04L 63/1425 |
| | | | 726/23 |
| 2018/0121652 A1‡ | 5/2018 | Wang | G06F 21/566 |
| 2018/0197089 A1‡ | 7/2018 | Krasser | H04L 41/145 |
| 2018/0198800 A1 | 7/2018 | Krasser et al. | |
| 2019/0188212 A1‡ | 6/2019 | Miller | G06F 16/285 |
| 2019/0324430 A1* | 10/2019 | Herzog | G05B 23/0283 |

OTHER PUBLICATIONS

"Training, test, and validation sets", retrieved on Mar. 9, 2018 at <<https://en.wikipedia.org/w/index.php?title=Training,_test,_and_validation_sets&oldid=752127502>>, Wikipedia, Nov. 29, 2016, 4 pages.‡

"Early Stopping", retrieved on Mar. 9, 2018 at <<https://en.wikipedia.org/w/index.php?title=Early_stopping&oldid=748816617>>, Wikipedia, Nov. 10, 2016, 5 pages.‡

David, et al., "DeepSign: Deep Learning for Automatic Malware Signature Generation and Classification", 2015 International Joint Conference on Neural Networks (IJCNN), Jul. 1, 2015, IEEE, pp. 1-8.‡

McCaffrey, J.,"Neural Network train-Validate-Test Stopping", Neural Network Lab, May 13, 2015, 8 pages.‡

Microsoft's Rich Signature (undocumented), retrieved Nov. 28, 2016 from <<http://www.ntcore.com/files/richsign.htm>>, 22 pages.‡

"Pairwise Metrics, Affinities and Kernels", Scikit Learn, retrieved Jan. 31, 2017 from <<http://scikit-learn.org/stable/modules/metrics.html>>, 4 pages.‡

Kornblum, J., Identifying Almost Identical Files Using Context Triggered Piecewise Hashing , Digital Investigation, 3S, 2006, 8 pages.‡

Leskovec, et al., Mining Massive Data Sets, Chapter 3, Finding Similar Items, Dec. 2014, retrieved from <http://infolab.stanford.edu/~ullman/mmds/ch3a.pdf>. pp. 55-111.‡

"Introduction to Booster Trees—xgboost 0.6 documentation", retrieved Jan. 31, 2017, from <<http://xgboost.readthedocs.io/en/latest/model.html>>, 7 pages.‡

"Variable Importance in Neural Networks—R is my Friend", retrieved Dec. 3, 2016 from <<https://beckmw.wordpress.com/2013/08/12/variable-importance-in-neural-networks/>>, 8 pages.‡

Wang, et al., "Hashing for similarity Search: A Survey", Aug. 14, 2014, 29 pages.‡

"What are MAPE, MAD, and MSD", Minitab 17 Support, retrieved Jan. 31, 2017 from <<http://support.minitab.com/en-us/minitab/17/topic-library/modeling-statistics/time-series/time-series-models/what-are-mape-mad-and-msd/>>, 2 pages.‡

Wicherski, G., "peHash: A Novel Approach to Fast Malware Clustering", RWTH Aachen University, retrieved from <<https://www.usenix.org/legacy/event/leet09/tech/full_papers/wicherski/wicherski.pdf>>, 8 pages.‡

"Rich Header", Trendy Stephen, Jan. 14, 2008, retrieved from <<http://trendystephen.blogspot.com/2008/01/rich-header.html>>, 2 pages.‡

Slaney, et al., Locality-Sensitive Hashing for Finding Nearest Neighbors , IEEE Signal Processing Magazine, Mar. 2008, 4 pages.‡

"Random Forest", Wikipedia, retrieved Jan. 31, 2017, from <<http://en.wikipedia.org/wiki/Random_forest>>, 7 pages.‡

"Cross-validation (statistics)", Wikipedia, retrieved Jan. 31, 2017 from <<https://en.wikipedia.org/wiki/Cross-validation_(statistics)>>, 8 pages.‡

Dean, et al., "Large Scale Distributed Deep Networks", retrieved Jan. 31, 2017 from <<http://static.googleusercontent.com/media/research.google.com/en//archive/large_deep_networks_nips2012.pdf >>, 11 pages.‡

Coates, et al., "Deep Learning with COTS HPC Systems", Proceedings of the 30th International Conference on Machine Learning, 2013, retrieved Jan. 31, 2017 from <<http://www.jmlr.org/proceedings/papers/v28/coates13.pdf>>, 9 pages.‡

Freund, et al., "A Short Introduction to Boosting", Journal of Japanese Society for Artificial Intelligence, 14(5), Sep. 1999, pp. 771-780.‡

"Improve Neural Network Generalization and Avoid Overfitting", Mathworks.com, retrieved Jan. 31, 2016, from <<https://help/nnet/ug/improve-neural-network-generalization-and-avoid-overfitting.html>>, 10 pages.‡

"Divide Data for Optimal Neural Network Training", Mathworks.com, retrieved Jan. 31, 2017 from <<https://www.mathworks.com/help/nnet/ug/divide-data-for-optimal-neural-network-training.html>>, 2 pages.‡

Benyamin, D., "A Gentle Introduction to Random Forests, Ensembles, and Performance Metrics in a Commercial System", CitizenNet, Nov. 10, 2012, 16 pages.‡

"Boosting", Wikipedia, retrieved Jan. 31, 2016 from <<https://en.wikipedia.org/wiki/Boosting_(machine_learning)>>, 6 pages.‡

Breiman, et al., "Random Forests", retrieved Jan. 31, 2017 from <<http://machinelearning202.pbworks.com/w/file/fetch/60606349/breiman_randomforests.pdf>>, pp. 1-14.‡

"Alert (TA16-091A)—Ransomware and Recent Variants", US Cert, Mar. 31, 2016, retrieved from <<https://www.us-cert.gov/ncas/alerts/TA16-091A>>, 2 pages.‡

Beck, M., "NeuralNetTools", published no later than Nov. 25, 2016, retrieved from <<https://cran.r-project.org/web/packages/NeuralNetTools/README.html>>, 3 pages.‡

"A New Virus Naming Convention 1991", CARO—Computer Antivirus Research Organization, retrieved Jan. 31, 2017 from <<http://www.caro.org/articles/naming.html>>, 3 pages.‡

"A New Virus Naming Convention 1991", CARO—Computer Antivirus Research Organization, retreived Jan. 31, 2017 from <<http://www.caro.org/articles/naming.html>>, 3 pages.

Beck, M., "NeuralNetTools", published no later than Nov. 25, 2016, retreived from <<https://cran.r-project.org/web/packages/NeuralNetTools/README.html>>, 3 pages.

The European Office Action dated Apr. 28, 2020, for European Patent Application No. 18150963.9, a counterpart foreign application of the U.S. Appl. No. 15/402,503, 5 pages.

Office action for U.S. Appl. No. 15/402,503, dated Sep. 19, 2019, Inventor #1, "Title of Application", 9 pages.

Final Office Action dated Apr. 15, 2020 for U.S. Appl. No. 15/402,503 "Validation-Based Determination of Computational Models" Krasser, 10 pages.

"What are MAPE, MAD, and MSD", Minitab 17 Support, retreived Jan. 31, 2017 from <<http://support.minitab.com/en-us/minitab/17/topic-library/modeling-statistics/time-series/time-series-models/what-are-mape-mad-and-msd/>>, 2 pages.

Wicherski, G., "peHash: A Novel Approach to Fast Malware Clustering", RWTH Aachen University, retried from <<https://www.usenix.org/legacy/event/leet09/tech/full_papers/wicherski/wicherski.pdf>>, 8 pages.

European Office Action dated Nov. 5, 2021 for European Patent Application No. 18150963.9, a foreign counterpart to U.S. Pat. No. 10,826,934, 6 pages.

\* cited by examiner
‡ imported from a related application

VALIDATION-BASED DETERMINATION OF COMPUTATIONAL MODELS

RELATED APPLICATION

This application is a divisional of, and claims priority to, U.S. patent application Ser. No. 15/402,503, filed on Jan. 10, 2017, entitled "VALIDATION-BASED DETERMINATION OF COMPUTATIONAL MODELS", the disclosure of which is fully incorporated herein by reference in its entirety.

BACKGROUND

With computer and Internet use forming an ever greater part of day to day life, security exploits and cyber attacks directed to stealing and destroying computer resources, data, and private information are becoming an increasing problem. For example, "malware", or malicious software, is a general term used to refer to a variety of forms of hostile or intrusive computer programs. Malware is, for example, used by cyber attackers to disrupt computer operations, to access and to steal sensitive information stored on the computer or provided to the computer by a user, or to perform other actions that are harmful to the computer and/or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs programs. Malware may be formatted as executable files (e.g., COM or EXE files), dynamic link libraries (DLLs), scripts, steganographic encodings within media files such as images, and/or other types of computer programs, or combinations thereof.

Malware authors or distributors ("adversaries") frequently disguise or obfuscate malware in attempts to evade detection by malware-detection or -removal tools. Consequently, it is time consuming to determine if a program is malware and, if so, to determine the harmful actions the malware performs without actually running the malware.

Throughout this document, hexadecimal values are prefixed with "0x" and C-style backslash escapes are used for special characters within strings.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
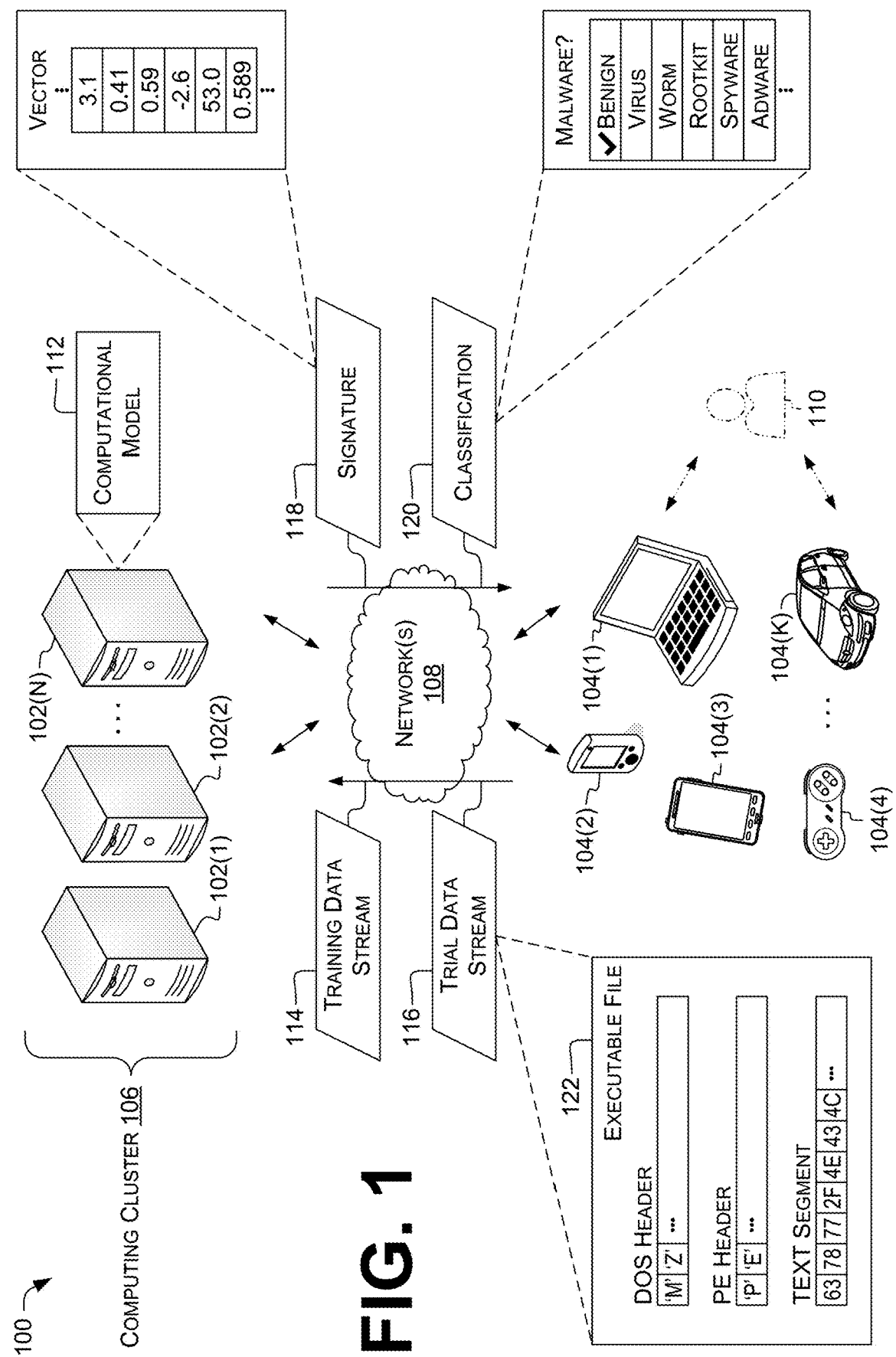
FIG. 1 is a block diagram depicting example scenarios for determining and operating computational models as described herein.

Some examples herein relate to detection or classification of malware, e.g., concealed malware. Some examples herein relate to determining of computational models that can detect malware or that can classify files (or other data streams, and likewise throughout this discussion). Classifications can include, e.g., malware vs. non-malware, or what type of malware (e.g., virus vs. Trojan). Some examples relate to determining representations of files that permit automatically sorting multiple files based on their characteristics, e.g., to permit effective training and validation of computational models. Some examples permit reducing the time or memory or network bandwidth required to train computational models. Some examples permit more effectively detecting or classifying malware samples.

Some examples herein determine a signature of a data stream including data stored in, e.g., a file, a disk boot sector or partition root sector, or a block of memory, or a portion thereof. For brevity, the term "sample" herein refers to a named collection of data from which a data stream can be retrieved, e.g., an individual malware file, a user file such as a document, a benign executable, or a malware-infected user file. The signature can indicate characteristics of the data stream, so that the degree of similarity between the signatures of two streams is positively correlated with the likelihood that those two files are, e.g., from the same family of malware. Signatures can include, but are not limited to, conventional antivirus-detection signatures.

Some examples determine training and validation sets of data based on comparisons of the signatures and then use the training and validation sets to determine a computational model. Some examples select the training and validation sets so that the signatures of items in the training set are generally different from the signatures of items in the validation set, e.g., using locality-sensitive hashing (LSH) or other nearest-neighbor(s) techniques. Some examples herein can determine a computational model that avoids overfitting and is more accurate for new inputs than can prior schemes. Some examples can significantly reduce the amount of time required to prepare the computational model, compared to prior schemes, by pre-arranging the training and validation sets in memory.

While example techniques described herein may refer to analyzing a program that may potentially be malware, it is understood that the techniques may also apply to other non-malicious software that includes obfuscation or other transformation of computer-executable instructions ("code") of the software. For example, a web server application may include code obfuscation to make it more difficult to locate security vulnerabilities in the code of the web server application. A digital video player may include code obfuscation to make it more difficult to reverse engineer a video decoding process. A commercial software product may include code obfuscation to protect its serial number algorithm so that it is more difficult for a software pirate to generate registration numbers for free. A cryptographic software product may include code obfuscation to hide a cryptographic algorithm. Accordingly, analysis of data streams discussed herein may be used by anti-malware security researchers, white-hat vulnerability researchers, interoperability developers, anti-piracy testers or other analysts of data streams. The above examples are not limiting; not all tools used in generating programs obfuscate their inputs.

Various entities, configurations of electronic devices, and methods for determining and operating computational models, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system.

Illustrative Environment

FIG. 1 shows an example scenario 100 in which examples of computational-model-based systems can operate and/or in which computational-model determination and/or use methods such as those described herein can be performed. Illustrated devices and/or components of scenario 100 include computing device(s) 102(1)-102(N) (individually and/or collectively referred to herein with reference 102), where N is any integer greater than and/or equal to 1, and computing devices 104(1)-104(K) (individually and/or collectively referred to herein with reference 104), where K is any integer greater than and/or equal to 1. In some examples, N=K; in other examples, N>K or N<K. Although illustrated as, e.g., desktop computers, laptop computers, tablet computers, and/or cellular phones, computing device(s) 102 and/or 104 can include a diverse variety of device categories, classes, and/or types and are not limited to a particular type of device.

In the illustrated example, computing device(s) 102(1)-102(N) can be computing nodes in a cluster computing system 106, e.g., a cloud service such as GOOGLE CLOUD PLATFORM or another cluster computing system ("computing cluster" or "cluster") having several discrete computing nodes (device(s) 102) that work together to accomplish a computing task assigned to the cluster as a whole. In some examples, computing device(s) 104 can be clients of cluster 106 and can submit jobs to cluster 106 and/or receive job results from cluster 106. Computing devices 102(1)-102(N) in cluster 106 can, e.g., share resources, balance load, increase performance, and/or provide fail-over support and/or redundancy. Computing devices 104 can additionally or alternatively operate in a cluster and/or grouped configuration. In the illustrated example, computing devices 104 communicate with computing devices 102. Additionally or alternatively, computing devices 104 can communicate with cluster 106, e.g., with a load-balancing or job-coordination device of cluster 106, and cluster 106 or components thereof can route transmissions to individual computing devices 102.

Some cluster-based systems can have all or a portion of the cluster deployed in the cloud. Cloud computing allows for computing resources to be provided as services rather than a deliverable product. For example, in a cloud-computing environment, resources such as computing power, software, information, and/or network connectivity are provided (for example, through a rental agreement) over a network, such as the Internet. As used herein, the term "computing" used with reference to computing clusters, nodes, and jobs refers generally to computation, data manipulation, and/or other programmatically-controlled operations. The term "resource" used with reference to clusters, nodes, and jobs refers generally to any commodity and/or service provided by the cluster for use by jobs. Resources can include processor cycles, disk space, random-access memory (RAM) space, network bandwidth (uplink, downlink, or both), prioritized network channels such as those used for communications with quality-of-service (QoS) guarantees, backup tape space and/or mounting/unmounting services, electrical power, etc. Cloud resources can be provided for internal use within an organization or for sale to outside customers. In some examples, computer security service providers can operate cluster 106, or can operate or subscribe to a cloud service providing computing resources.

In some examples, as indicated, computing device(s), e.g., computing devices 102(1) and 104(1), can intercommunicate to participate in and/or carry out computational-model determination and/or operation as described herein. For example, computing device 104(1) can be or include a data source owned or operated by or on behalf of a user, and computing device 102(1) can be a computational-model determination and operation system, as described below.

Different devices and/or types of computing devices 102 and 104 can have different needs and/or ways of interacting with cluster 106. For example, computing devices 104 can interact with cluster 106 with discrete request/response communications, e.g., for queries and responses using an already-determined computational model. Additionally and/or alternatively, computing devices 104 can be data sources and can interact with cluster 106 with discrete and/or ongoing transmissions of data to be used as input to a computational model or a process of determining a computational model. For example, a data source in a personal computing device 104(1) can provide to cluster 106 data of newly-installed executable files, e.g., after installation and before execution of those files. The data of newly-installed executable files can include, e.g., data such as that as described herein with respect to training data streams 114 or trial data streams 116. This can provide improved accuracy of outputs of a computational model (CM), e.g., a malware-detection CM, by increasing the amount of data input to the CM. Additionally and/or alternatively, computing devices 104 can be data sinks and can interact with cluster 106 with discrete and/or ongoing requests for data output from a CM, e.g., updates to firewall or routing rules based on changing network conditions.

In some examples, computing devices 102 and/or 104 can communicate with each other and/or with other computing devices via one or more network(s) 108. In some examples, computing devices 102 and 104 can communicate with external devices via network(s) 108. For example, network(s) 108 can include public networks such as the Internet, private networks such as an institutional and/or personal intranet, and/or combination(s) of private and public networks. Communications between computing devices 102 and/or 104 via network(s) 108 can be structured, e.g., according to defined application programming interfaces (APIs). For example, data can be retrieved via network(s) 108, e.g., using a Hypertext Transfer Protocol (HTTP) request such as a GET to a Web Services and/or Representational State Transfer (REST) API endpoint. Remote Procedure Call (RPC) APIs or other types of APIs can additionally or alternatively be used for network communications.

In some examples, computing devices 102 and/or 104, e.g., laptops, smartphones, and/or other computing devices 102 and/or 104 described herein, interact with an entity 110 (shown in phantom). The entity 110 can include systems, devices, parties such as users, and/or other features with which computing devices 102 and/or 104 can interact. For brevity, examples of entity 110 are discussed herein with reference to users of a computing system; however, these examples are not limiting. In some examples, computing device 104 is operated by entity 110, e.g., a user. In some examples, computing devices 102 operate CM(s) to determine a model output corresponding to a file on a user's computing device 104, and transmit an indication of the model output via network 108 to the computing device 104, e.g., a smartphone. The computing device 104 can, e.g., present information of the model output to entity 110. Examples processing of trial files, e.g., from a user's computing device 104, are discussed in more detail below with reference to at least FIG. 3 or 12.

Computing device(s) 102 can store one or more computational model(s), CM(s), 112, individually and/or collectively referred to herein with reference 112. In some examples, algorithms for determining or operating CM(s) 112 as described herein can be performed on a computing device (e.g., computing device 102), such as a smart phone, a tablet, a desktop computer, a server, a server blade, a supercomputer, etc. The resulting models can be used on such computing devices and/or on computing devices (e.g., computing device 104) having one or more input devices, such as a physical keyboard, a soft keyboard, a touch screen, a touch pad, microphone(s), and/or camera(s). In some examples, functions described herein can be shared between one or more computing device(s) 102 and one or more computing device(s) 104. For example, the computing device(s) 102 can determine a CM 112 initially and the computing device(s) 104 can perform incremental updating of the CM 112.

In various examples, e.g., of CM(s) 112 for determining signatures of files, classifying files, determining whether files contain malware, or other use cases noted herein, the computational model(s) 112 may include, but are not limited to, multilayer perceptrons (MLPs), neural networks (NNs), gradient-boosted NNs, deep neural networks (DNNs), recurrent neural networks (RNNs) such as long short-term memory (LSTM) networks or Gated Recurrent Unit (GRU) networks, decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMMs). The CMs 112 can additionally or alternatively include regression models, e.g., linear or nonlinear regression using mean squared deviation (MSD) or median absolute deviation (MAD) to determine fitting error during the regression; linear least squares or ordinary least squares (OLS); fitting using generalized linear models (GLM); hierarchical regression; Bayesian regression; or nonparametric regression.

The CMs 112 can include parameters governing or affecting the output of the CM 112 for a particular input. Parameters can include, but are not limited to, e.g., per-neuron, per-input weight or bias values, activation-function selections, neuron weights, edge weights, tree-node weights, or other data values. A training module 226, FIG. 2, can be configured to determine CMs 112, e.g., to determine values of parameters in CMs 112. For example, CMs 112 can be determined using an iterative update rule such as gradient descent (e.g., stochastic gradient descent or AdaGrad) with backpropagation.

In some examples, the training module 226 can determine the CMs 112 based at least in part on "hyperparameters," values governing the training process. Example hyperparameters can include learning rate(s), momentum factor(s), minibatch size, maximum tree depth, regularization parameters, class weighting, or convergence criteria. In some examples, the training module 226 can determine the CMs 112 in an iterative process involving updating and validation. The training data set can be used to update the CMs 112, and the validation data set can be used in determining (1) whether the updated CMs 112 meet training criteria or (2) how the next update to the CMs 112 should be performed. Examples are discussed herein, e.g., with reference to at least FIG. 8.

The computing device(s) 102 can be configured to use the determined parameter values of trained CM(s) 112 to, e.g., categorize a file with respect to malware type, and/or to perform other data analysis and/or processing. In some examples, the computing device 104 can be configured to communicate with computing device(s) 102 to operate a CM 112. For example, the computing device 104 can transmit a request to computing device(s) 102 for an output of the CM(s) 112, receive a response, and take action based on that response. For example, the computing device 104 can provide to entity 110 information included in the response, or can quarantine or delete file(s) indicated in the response as being associated with malware.

In the illustrated example, computing device(s) 104 provide data streams (or portions thereof, and likewise throughout this document) to computing device(s) 102. The illustrated data streams include training data stream 114 and trial data stream 116. Although only one of each stream 114 and 116 is shown, multiple of either can be used. The computing device(s) 102 can determine or operate CM 112 based at least in part on the stream(s) 114 and 116. The computing device(s) 102 can provide to computing device(s) 104 a signature 118, a classification 120, or other outputs of CM 112. In some examples, at least one of, or all of, the training data stream(s) 114 or trial data stream(s) can comprise or consist of the partial or full contents of respective digital files, e.g., executable files, data files, or system files. In some examples, training data stream 114 can be used in determining CM 112, and CM 112 can be operated to determine whether trial data stream 116 is associated with malware.

In the illustrated example, trial data stream 116 includes bytes of an executable file ("EXE") 122, e.g., a WINDOWS Portable Executable (PE)-format file. The specific illustrated form and contents of executable file 122 are provided for clarity of explanation, and are not limiting. The illustrated executable file 122 includes a DOS (Disk Operating System) header, a PE header, and a TEXT segment including computer-executable instructions. In this example, the first byte of the TEXT segment is an entry point at which execution begins, e.g., after an operating system loads the executable file 122 into memory. Trial data stream 116 can include any number of bytes of the executable file 122, e.g., of headers, the TEXT segment, or other segments (e.g., a DATA segment holding compile-time-initialized data). In some examples, trial data stream 116 includes ten (or another number of) bytes beginning with the byte at the entry point. Analyzing bytes beginning with or shortly after the entry point can permit identifying characteristics of tool(s) used in preparing the executable file, since such tools often embed specific code sequences in the files they output.

In some examples, data streams 114 and 116 have the same format (although this is not required). Moreover, in some examples, CM 112 can perform the same processing on a training data stream 114 as on a trial data stream 116. Accordingly, discussion herein of formats or processing of trial data stream 116 can additionally or alternatively apply to training data stream 114, and vice versa, unless otherwise expressly specified.

In the illustrated example, the signature 118 includes a vector of numerical values, shown as real numbers, although at least some of the numerical values can additionally or alternatively be fractions, integers, imaginary numbers, complex numbers, or other numerical values. The numerical values can be or include feature values, e.g., representing the contents or structure of the data in the data stream 116. In some examples, the values can be between zero and unity, or at least zero, or at most zero, or unrestricted. The values can be stored in various formats, including two's-complement or sign-magnitude integers or IEEE-754 four-byte ("single") or eight-byte ("double") floating point formats. The term "float value," as used herein, can refer to a value formatted as a single, double, or any other floating-point format. In some examples, signature 118 can include scalar value(s), e.g., numeric, character, string, or boolean value, or compound value(s) such as tuples, structures, or arrays. A compound value can include at least one of a scalar value or another compound value. In some examples, a signature 118 can include a copy of part or all of the respective stream 114 or 116. In some examples, a signature 118 can include text, e.g., the name of at least one of a family of malware or of a specific virus or other malicious program.

In the illustrated example, the classification 120 includes a bitmask, attribute list, or other representation of categories to which the trial data stream 116 belongs, as determined by CM 112. For example, classification 120 can include a Boolean value indicating whether or not trial data stream 116 is associated with malware, or an enumerated value indicating with which of several categories trial data stream 116 is associated (e.g., "benign," "virus," or "spyware"). Classification 120 can additionally or alternatively include one or more confidence values or other values indicating the likelihood of a classification, e.g., a "spyware" value of 0.42 indicating a 42% likelihood that the sample is spyware. In an example, classification 120 can include multiple confidence values for respective categories of malware (e.g., "spyware=0.42; worm=0.05").

Malware programs and other files are often prepared by or using various software tools, referred to herein for brevity as "generators." Generator processing can remove or change characteristics of a file, e.g., by modifying headers or removing markers commonly found in a non-processed file. Example generators can include compilers, linkers, librarians, or other software-development tools useful in preparing computer-executable instructions ("code"); packers, encryptors, or other code-obfuscation tools; or installation, copy-protection, archiving, or self-extractor generation tools useful in packaging the executable code into an executable file or in assembling an executable file from components.

A data stream 114 or 116, e.g., an executable file 122, can be associated with malware if, e.g., the data stream is itself malicious code, is (or is likely) at least a portion of a grouping of malicious code, or is output by a generator commonly used for generating malware. For example, a data stream 114 or 116 may include a decruncher that decompresses data from a file into RAM. A decruncher itself may be entirely benign. However, the decompressed data may be or include executable code of a malicious program, dynamic-link library (DLL), or other computer-executable module. Accordingly, a decruncher commonly used to compress malicious code, or compressed malicious code itself, may be associated with malware, as indicated by the classification 120. Some generators are used for malware, and are also used for legitimate software. A determination that a data stream is associated with malware does not necessarily require or guarantee that the data stream in fact be malware. In some examples, classification 120, discussed below, can be used by a security analyst in triaging data streams, and can permit the security analyst to readily separate data streams based on a likelihood they are in fact malware In some examples, malware comprises malicious data instead of or in addition to malicious code. Such data is also considered to be associated with malware. For example, some programs may have bugs that prevent them from correctly processing certain inputs. Examples include Structured Query Language (SQL) injection attacks, in which a program populates a query with unescaped external data. For example, the query template "SELECT cost from Products WHERE name LIKE '%{$name}%';" can be abused by providing malicious data to be populated in place of the placeholder "{$name}". When the malicious data $name="foo'; DROP TABLE Products;—" is substituted into the query template, for example, the resulting query will cause the "Products" table of the database to be deleted ("dropped"), causing unexpected loss of data. In another example, malicious data can include malformed UTF-8 (Unicode Transformation Format—8 bit) that causes a buggy UTF-8 processing routine to enter an unexpected or erroneous state. In still another example, malicious data can include data that is too large or too complicated for a processing routine to handle, e.g., a Christmas-tree packet. Such data can trigger buffer overflows or other vulnerabilities within processing routines. Data designed to trigger or exploit vulnerabilities is associated with malware.

Except as expressly indicated otherwise, a determination of whether a trial data stream 116 is associated with malware is carried out programmatically by or using CM 112 according to techniques herein. Various examples herein can be performed without human judgment of whether a program or data block is in fact malicious. Using CM 112 can permit more readily identifying potential computational threats, e.g., in the context of an antivirus program or cloud security service.

By way of example and not limitation, computing device(s) 102 and/or 104 can include, but are not limited to, server computers and/or blade servers such as Web servers, map/reduce servers and/or other computation engines, and/or network-attached-storage units (e.g., 102(1)), laptop computers, thin clients, terminals, and/or other mobile computers (e.g., 104(1)), wearable computers such as smart watches and/or biometric and/or medical sensors, implanted computing devices such as biometric and/or medical sensors, computer navigation client computing devices, satellite-based navigation system devices including global positioning system (GPS) devices and/or other satellite-based navigation system devices, personal data assistants (PDAs), and/or other specialized portable electronic devices (e.g., 104(2)), tablet computers, tablet hybrid computers, smartphones, mobile phones, mobile phone-tablet hybrid devices, and/or other telecommunication devices (e.g., 104(3)), portable and/or console-based gaming devices and/or other entertainment devices such as network-enabled televisions, set-top boxes, media players, cameras, and/or personal video recorders (PVRs) (e.g., 104(4), depicted as a gamepad), automotive computers such as vehicle control systems, vehicle security systems, and/or electronic keys for vehicles (e.g., 104(K), depicted as an automobile), desktop computers, and/or integrated components for inclusion in computing devices, appliances, and/or other computing device(s) configured to participate in and/or carry out computational-model determination and/or operation as described herein, e.g., for file-analysis or malware-detection purposes.

Network(s) 108 can include any type of wired and/or wireless network, including but not limited to local area networks (LANs), wide area networks (WANs), satellite networks, cable networks, Wi-Fi networks, WiMAX networks, mobile communications networks (e.g., 3G, 4G, and so forth) and/or any combination thereof. Network(s) 108 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 108 can also include a number of devices that facilitate network communications and/or form a hardware infrastructure for the networks, such as switches, routers, gateways, access points, firewalls, base stations, repeaters, backbone devices, and the like. Network(s) 108 can also include devices that facilitate communications between computing devices 102 and/or 104 using bus protocols of various topologies, e.g., crossbar switches, INFINIBAND switches, and/or FIBRE CHANNEL switches and/or hubs.

In some examples, network(s) 108 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), other standards, e.g., BLUETOOTH, cellular-telephony standards such as GSM, LTE, and/or WiMAX.

As noted above, network(s) 108 can include public network(s) or private network(s). Example private networks can include isolated networks not connected with other networks, such as MODBUS, FIELDBUS, and/or Industrial Ethernet networks used internally to factories for machine automation. Private networks can also include networks connected to the Internet and/or other public network(s) via network address translation (NAT) devices, firewalls, network intrusion detection systems, and/or other devices that restrict and/or control the types of network packets permitted to flow between the private network and the public network(s).

Different networks have different characteristics, e.g., bandwidth or latency, and for wireless networks, accessibility (open, announced but secured, and/or not announced), and/or coverage area. The type of network 108 used for any given connection between, e.g., a computing device 104 and cluster 106 can be selected based on these characteristics and on the type of interaction, e.g., ongoing streaming or intermittent request-response communications.

Illustrative Configurations

Figure 2:
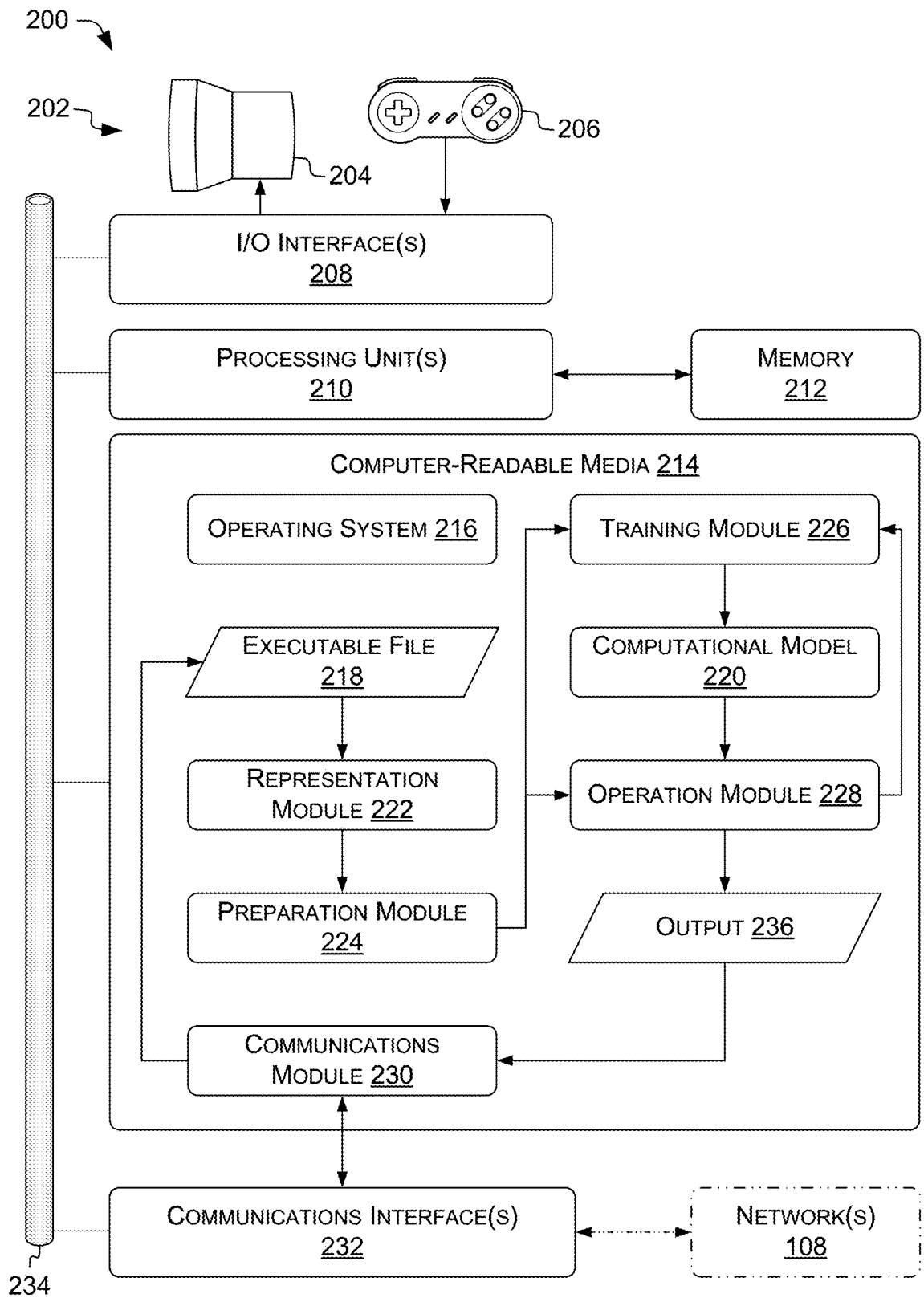
FIG. 2 is a block diagram depicting an example computing device configured to participate in determining or operating computational model(s) according to various examples described herein.

FIG. 2 is an illustrative diagram that shows example components of a computing device 200, which can represent computing device(s) 102 and/or 104, and which can be and/or implement a computational-model determination and/or operation system, device, and/or apparatus, according to various examples described herein. Computing device 200 can include and/or be included in a system and/or device for determining and/or operating a computational model as described herein.

Computing device 200 can include and/or be connected to a user interface 202. In some examples, user interface 202 can be configured to permit a user, e.g., entity 110 and/or a computational-model (CM) administrator, to operate the CM 112, or to control and/or otherwise interact with cluster 106 and/or computing devices 102 therein. Accordingly, actions such as presenting information of or corresponding to an output of a CM 112 to entity 110 can be taken via user interface 202.

In some examples, user interface 202 can include various types of output devices configured for communication to a user and/or to another computing device 200. Output devices can be integral and/or peripheral to computing device 200. Examples of output devices can include a display 204, a printer, audio speakers, beepers, and/or other audio output devices, a vibration motor, linear vibrator, and/or other haptic output device, and the like. Display 204 can include an organic light-emitting-diode (OLED) display, a liquid-crystal display (LCD), a cathode-ray tube (CRT), and/or another type of visual display. Display 204 can be a component of a touchscreen, and/or can include a touchscreen.

User interface 202 can include a user-operable input device 206 (depicted as a gamepad). User-operable input device 206 can include one or more input devices, integral and/or peripheral to computing device 200. The input devices can be user-operable, and/or can be configured for input from other computing device 200. Examples of input devices can include, e.g., a keyboard, keypad, a mouse, a trackball, a pen sensor and/or smart pen, a light pen and/or light gun, a game controller such as a joystick and/or game pad, a voice input device such as a microphone, voice-recognition device, and/or speech-recognition device, a touch input device such as a touchscreen, a gestural and/or motion input device such as a depth camera, a grip sensor, an accelerometer, another haptic input, a visual input device such as one or more cameras and/or image sensors, and the like. User queries can be received, e.g., from entity 110, via user interface 202.

Computing device 200 can further include one or more input/output (I/O) interface(s) 208 to allow computing device 200 to communicate with input, output, and/or I/O devices (for clarity, some not depicted). Examples of such devices can include components of user interface 202 such as user-operable input devices and output devices described above. Other examples of such devices can include power meters, accelerometers, and other devices for measuring properties of entity 110, computing device 200, and/or another computing device 102 and/or 104. Computing device 200 can communicate via I/O interface 208 with suitable devices and/or using suitable electronic/software interaction methods. Input data, e.g., of user inputs on user-operable input device 206, can be received via I/O interface 208 (e.g., one or more I/O interface(s)). Output data, e.g., of user interface screens, can be provided via I/O interface 208 to display 204, e.g., for viewing by a user.

The computing device 200 can include one or more processing unit(s) 210. In some examples, processing unit(s) 210 can include and/or be connected to a memory 212, e.g., a RAM and/or cache. Processing units 210 can be operably coupled to the I/O interface 208 and to at least one computer-readable media 214 (CRM), e.g., a tangible non-transitory computer-readable medium.

Processing unit(s) 210 can be and/or include one or more single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing units 210 include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 102 and/or 104, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for graphics processing units (GPUs) and central processing unit (CPUs). In some examples at least one processing unit 210, e.g., a CPU, graphics processing unit (GPU), and/or hardware logic device, can be incorporated in computing device 200, while in some examples at least one processing unit 210, e.g., one or more of a CPU, GPU, and/or hardware logic device, can be external to computing device 200.

Computer-readable media described herein, e.g., CRM 214, includes computer storage media and/or communication media. Computer storage media includes tangible storage units such as volatile memory, nonvolatile memory, and/or other persistent and/or auxiliary computer storage media, removable and non-removable computer storage media implemented in any method and/or technology for storage of information such as computer-readable instructions, data structures, program modules, and/or other data. Computer storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by a computing device 200.

In contrast to computer storage media, communication media can embody computer-readable instructions, data structures, program modules, and/or other data in a modulated data signal, such as a carrier wave, and/or other transmission mechanism. As defined herein, computer storage media does not include communication media.

In some examples, CRM 214 can store instructions executable by the processing unit(s) 210, and/or instructions executable by external processing units such as by an external central processing unit (CPU) and/or external processor of any type discussed herein. Any of these instructions are referred to herein as computer-executable instructions or processor-executable instructions. For example, CRM 214 can store instructions of an operating system 216. CRM 214 can additionally or alternatively store at least one executable file 218, which can represent executable file 122, FIG. 1. Executable file 218 represents any file comprising computer-executable instructions, even if those instructions are compressed, encrypted, or otherwise obfuscated. In some examples, executable file 218 comprises at least one header or other information usable by a loader (e.g., a loading routine such as UNIX/POSIX exec(2)) in loading the computer-executable instructions from executable file 218 into a RAM or other high-speed memory, or in otherwise preparing computer-executable instructions from executable file 218 for execution by processing unit(s) 210. In the illustrated example, the loader is a component of the operating system 216, although some examples, e.g., bare-metal embedded-systems configurations, can include a loader but not an operating system 216. Examples herein are discussed with reference to executable file 218 and can additionally or alternatively be used for other types of files, e.g., data files.

Table 1 shows an example of a portion of executable file 218. Table 1 shows an example of a conventional MICROSOFT WINDOWS Portable Executable (PE) file, but this example is not limiting. Executable file 218 can be, for example, an a. out, Common Object File Format (COFF), MZ (MS-DOS), NE (WINDOWS 3.1), PE, Mach-O, or Executable and Linkable Format (ELF) compiled object file (e.g., a standalone executable or a static or dynamic library), an ar static-library archive, a Java Archive (JAR), or a Dalvik Executable (DEX) archive.

TABLE 1

| Offset | Field |
| --- | --- |
| 0x00 | Pattern: 0x4D 0x5A |
| ... | |
| 0x3C | Offset of PE header, referred to in this table as "OFS". |
| ... | |
| OFS + 0x00 | Pattern: 0x50 0x45 |

TABLE 1-continued

| Offset | Field |
|---|---|
| ... | |
| OFS + 0x28 | Offset of entry point, in this table "ENTRY" |
| ... | |
| ENTRY + 0x00 | The code to be executed after the executable file is loaded, typically library-provided startup code |
| ... | |
| ENTRY + n | A jump from the startup code to the beginning of code specific to the particular executable file |
| ... | |
| MAIN | The code specific to the particular executable file, e.g., compiled from the C main( ) function. |

In some examples, trial data stream 116 can include a predetermined number of bytes beginning at address ENTRY or at address MAIN in Table 1. In some examples, trial data stream 116 can include a predetermined number of bytes beginning at the beginning of a particular section of an executable file, e.g., a TEXT or DATA segment. In some examples, trial data stream 116 can include a predetermined number of bytes beginning at a header with the trial data stream 116, e.g., an MP3 header or an ID3v2 or VORBIS comment block.

Computer-executable instructions or other data stored on CRM 214 can additionally or alternatively include at least one computational model (CM) 220, which can represent CM 112, FIG. 1, or instructions of the operating system 216, a representation module 222, a preparation module 224, a training module 226, an operation module 228, a communications module 230, and/or other modules, programs, and/or applications that are loadable and executable by processing unit(s) 210. Processing unit(s) 210 can be configured to execute modules of the plurality of modules. For example, the computer-executable instructions stored on the computer-readable media 214 can upon execution configure a computer such as a computing device 200 to perform operations described herein with reference to the modules of the plurality of modules. The modules stored in the computer-readable media 214 can include instructions that, when executed by the one or more processing units 210, cause the one or more processing units 210 to perform operations described below. For example, the computer-executable instructions stored on the computer-readable media 214 can upon execution configure a computer such as a computing device 102 and/or 104 to perform operations described herein with reference to the operating system 216 or the above-listed modules 222-230.

In some examples not shown, one or more of the processing unit(s) 210 in one of the computing device(s) 102 and/or 104 can be operably connected to computer-readable media 214 in a different one of the computing device(s) 102 and/or 104, e.g., via communications interface 232 (discussed below) and network 108. For example, program code to perform steps of flow diagrams herein, e.g., as described herein with reference to modules 222-230, can be downloaded from a server, e.g., computing device 102(1), to a client, e.g., computing device 104(K), e.g., via the network 108, and executed by one or more processing unit(s) 210 in computing device 104(K).

The computing device 200 can also include a communications interface 232, which can include a transceiver device such as a network interface controller (NIC) to send and receive communications over a network 108 (shown in phantom), e.g., as discussed above. As such, the computing device 200 can have network capabilities. Communications interface can include any number of network, bus, and/or memory interfaces, in any combination, whether packaged together and/or separately. In some examples, communications interface 232 can include a memory bus internal to a particular computing device 102 or 104, transmitting via communications interface 232 can include storing the transmitted data in memory 212 or computer-readable media 214, and receiving via communications interface 232 can include retrieving data from memory 212 or computer-readable media 214. In some examples, the communications interface 232 can include, but is not limited to, a transceiver for cellular (3G, 4G, and/or other), WI-FI, Ultra-wideband (UWB), BLUETOOTH, and/or satellite transmissions. The communications interface 232 can include a wired I/O interface, such as an Ethernet interface, a serial interface, a Universal Serial Bus (USB) interface, an INFINIBAND interface, and/or other wired interfaces. The communications interface 232 can additionally and/or alternatively include at least one user-interface device or user interface, at least one bus such as a memory bus and/or local bus, at least one memory interface, and/or at least one hardwired interface such as a 0-20 mA control line.

In some examples, the operating system 216 can include components that enable and/or direct the computing device 200 to receive data via various inputs (e.g., user controls such as user-operable input device 206, network and/or communications interfaces such as communications interface 232, devices implementing memory 212, and/or sensors), and process the data using the processing unit(s) 210 to generate output. The operating system 216 can further include one or more components that present the output (e.g., display an image on an electronic display 204, store data in memory 212, and/or transmit data to another computing device 102 or 104. The operating system 216 can enable a user (e.g., entity 110) to interact with the computing device 200 using a user interface 202. Additionally, the operating system 216 can include components that perform various functions generally associated with an operating system, e.g., storage management and internal-device management.

In some examples, the processing unit(s) 210 can access the module(s) on the computer-readable media 214 via a bus 234. I/O interface 208 and communications interface 232 can also communicate with processing unit(s) 210 via bus 234. Bus 234 can include, e.g., at least one of a system bus, a data bus, an address bus, a Peripheral Component Interconnect (PCI) Express (PCIe) bus, a PCI bus, a Mini-PCI bus, any variety of local, peripheral, and/or independent buses, and/or any combination thereof.

In various examples, the number of modules can vary higher and/or lower, and modules of various types can be used in various combinations. For example, functionality described associated with the illustrated modules can be combined to be performed by a fewer number of modules and/or APIs and/or can be split and performed by a larger number of modules and/or APIs. For example, the representation module 222 and the preparation module 224 can be combined in a single module that performs at least some of the example functions described below of those modules, or, likewise, the training module 226 and the operation module 228, or all four modules 222-228. In some examples, computer-readable media 214 can include a subset of the above-described modules.

In the illustrated example, the representation module 222 determines a signature 118 of the executable file 218. For example, the signature can include a locality-sensitive hash (LSH) value of a feature vector associated with the executable file 218. Examples are discussed herein, e.g., with reference to at least one of FIG. 3-7, 9, 11, or 12.

In the illustrated example, the preparation module 224 determines a training set and a validation set of the training data streams 114 based at least in part on the signature 118. For example, the preparation module 224 can divide a collection of training data streams 114 into the training set and the validation set. Examples are discussed herein, e.g., with reference to at least one of FIG. 3, 4, 6, 10, or 11.

In the illustrated example, the training module 226 determines the CM 220, e.g., based at least in part on the training set. For example, the training module 226 can update parameters of a neural network based at least in part on the training data streams 114 of the training set. Examples are discussed herein, e.g., with reference to at least one of FIG. 3, 4, 6, 8-10, or 12.

In the illustrated example, the operation module 228 operates the CM 220 based at least in part on a trial data stream 116 to provide atrial model output. The trial model output can include a classification 120. Examples are discussed herein, e.g., with reference to at least one of FIG. 3-5, 8-10, or 12. Operation module 228 can provide an output 236, e.g., a signature 118 or classification 120. Output 236 is shown as stored in computer-readable media 214. Output 236 can additionally or alternatively be stored in memory 212 or another processor-accessible storage device, e.g., a transmit buffer of communications interface 232. In some examples, the classification 120 can indicate whether the trial data stream 116 is associated with malware. In some examples, CM 220 can be configured to provide a classification 120 for any type of trial data stream 116. In other examples, CM 220 can be configured to provide a classification 120 for trial data stream 116 known to be of a particular type, e.g., of a particular family of malware. For example, separate CMs 220 can be determined and operated for ransomware and spyware.

In some examples, the operation module 228 can determine respective outputs 236 for multiple trial data streams 116. The operation module 228 can then locate data streams 116 similar to a given data stream 116 based at least in part on similarity of the outputs 236, e.g., based on Euclidean or another distance metric between the respective outputs 236 for multiple different data streams 116 (e.g., files).

In some examples, the training module 226 or the operation module 228 can operate the CM 220 based at least in part on training data stream(s) 114 of the validation set to evaluate the performance of the CM 220. The CM 220 can then be updated based on the evaluation. The arrow from operation module 228 to training module 226 depicts coordination between those modules; alternatively, the evaluation and updating can both be performed by the training module 226.

In the illustrated example, the communications module 230 can transmit an indication of the output 236, e.g., via the communications interface 232. For example, the indication can be transmitted to a computing device 104. Examples are discussed herein, e.g., with reference to FIG. 1. In some examples, communications module 230 can additionally or alternatively receive the executable file 218 (or another data stream) via the communications interface 232.

In some examples, the operation module 228, the communications module 230, or another module stored in computer-readable media 214 can be configured to receive inputs, e.g., via user-operable input device 206 or from a filesystem, transmit corresponding queries to a computing device 102, receive responses from computing device 102, and present the responses, e.g., via display 204. In some examples, determination and operation of CMs are carried out on computing device(s) 102. In some examples, determination and operation are carried out on a computing device 104. In some of these examples, any of the above-noted modules can be configured to receive inputs, determine and/or operate CM(s) 112 using instructions of operation module 228 based at least in part on those inputs, e.g., to determine a model output. In some examples, computer-executable instructions on computer-readable media 214 can include, but are not limited to, instructions of a Web browser, smartphone app or desktop application, background service conducting or monitoring network communications, or instant-messaging client, or can include components of any of those configured to perform functions described herein. Such programs or components can invoke or include functions of any of the listed modules.

Illustrative Processes

Figure 3:
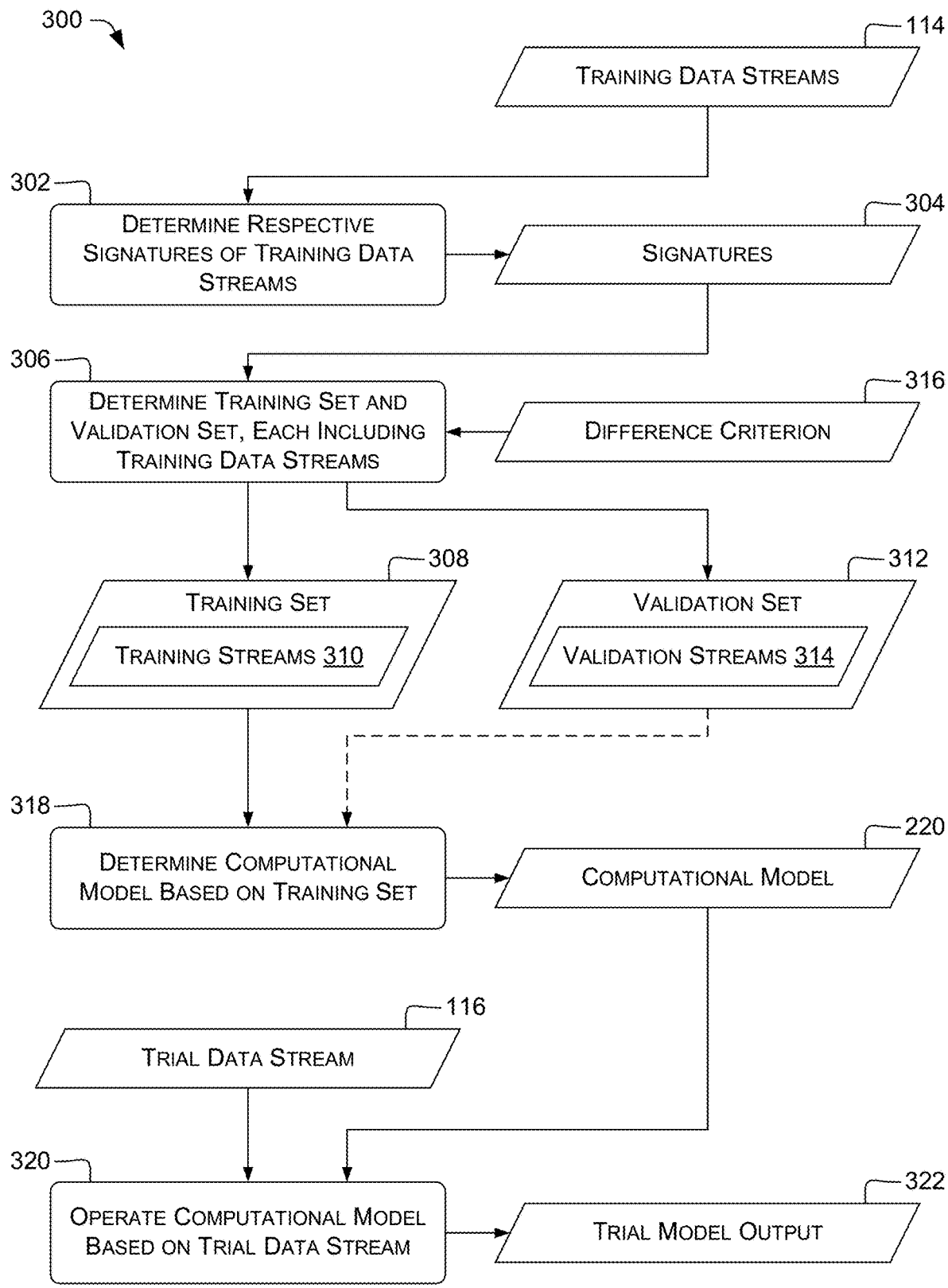
FIG. 3 is a dataflow diagram that illustrates example processes for determining and operating computational model(s) according to various examples described herein.

FIG. 3 is a dataflow diagram that illustrates an example process 300 for determining and operating computational model(s), and related dataflow. Example functions shown in FIG. 3 and other flow diagrams and example processes herein can be implemented on and/or otherwise embodied in one or more computing device(s) 102 and/or 104, e.g., a computing device 200, e.g., using software running on such device(s), e.g., software executed by processing unit(s) 210. For the sake of illustration, the example process 300 is described below with reference to processing unit 210 and other components shown in FIGS. 1 and 2 that can carry out and/or participate in the steps of the exemplary method. However, other processing unit(s) such as processing unit(s) 210 and/or other components of computing device(s) 102 and/or 104 can carry out step(s) of described example processes such as process 300. Similarly, exemplary method(s) shown in FIGS. 4-12 are also not limited to being carried out by any specifically-identified components.

The order in which the operations are described in each example flow diagram and/or process is not intended to be construed as a limitation, and any number of the described operations can be combined in any order and/or in parallel to implement each process. In each flow diagram, fewer than all of the depicted operations can be performed, except as expressly noted. Moreover, the operations in each of FIGS. 3-12 can be implemented in hardware, software, and/or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2.

For clarity of explanation, the operations of FIG. 3 are described in terms of a batch process. However, this is not limiting, and the operations of FIG. 3 (or FIGS. 4-12) can be performed in a streamed or pipelined manner, or any combination of batch, stream, and pipelined processing.

In some examples, at operation 302, the representation module 222 determines respective signatures 304 of individual training data streams 114 of a plurality of training data streams 114. As discussed above, the training data streams 114 can be, include, or consist of files or other streams of data. Each training data stream 114 can include the entirety of a data unit such as a file, or only a portion thereof. In some examples, the signature 118 for a training data stream 114 can include a feature vector or hash value of the training data stream 114, or other values described above with reference to FIG. 1. In some examples, the representation module 222 can determine the signatures as LSH values of or otherwise associated with the respective training data streams 114. Examples of feature vectors and LSH are discussed herein with reference to operation 402, FIG. 4, and to FIGS. 5 and 11.

In some examples, the representation module 222 can determine at least one of the signatures 304 including or consisting of a hash of at least a portion of the respective training data stream 114. For example, the representation module 222 can compute a cryptographic hash value, e.g., a Secure Hash Algorithm 2-256 bit (SHA-256), SHA-3, Skein, or other cryptographic hash value, of at least part of the respective training data stream 114. In some examples, the representation module 222 can determine at least one of the signatures 304 including or consisting of a value determined using context-triggered piecewise hashing, e.g., the ssdeep hash, or another content-dependent hash technique.

In some examples, at least one of the plurality of training data streams 114 comprises at least part of an executable file 218. For example, each training data streams 114 can include at least part of a respective executable file 218. In some examples, no two training data streams 114 are associated with the same executable file 218. In some examples, at least two of the training data streams 114 are associated with the same executable file 218. For example, a fat binary including code for multiple processor architectures can be associated with multiple training data streams 114, one for each architecture.

In some examples, at operation 306, the preparation module 224 determines a training set 308 comprising at least some training streams 310 of the plurality of training data streams 114 and a validation set 312 comprising at least some validation streams 314 of the plurality of training data streams 114. In some examples, at least one of the training set 308 and the validation set 312 additionally includes at least some labels indicating target model outputs associated with the respective training streams 310 or validation streams 314. In some examples of training a computational model 220 to determine a classification 120 of a data stream, the respective labels can include respective classifications 120 of the respective training streams 310 or validation streams 314. For example, some of the training streams 310 or validation streams 314 can be associated with malware (for brevity, "dirty"), some of the training streams 310 or validation streams 314 can be not associated with malware ("clean"), and labels for the training streams 310 or validation streams 314 can indicate whether or not respective streams are associated with malware. In some examples, the preparation module 224 can select the training set 308 and the validation set 312 so that each of the training set 308 and the validation set 312 includes at least one clean stream and at least one dirty stream.

The preparation module 224 can select the training set 308 and the validation set 312 based at least in part on the signatures 118 and a predetermined difference criterion 316. In some examples, the preparation module 224 can select the validation set 312 so that each validation data stream 314 is dissimilar to, i.e., satisfies the predetermined difference criterion 316 with respect to, each training stream 310. This can reduce the risk of overfitting of computational model (CM) 220, since a computational model 220 tested on the validation streams 314 will not have been trained on similar training streams 310. In some examples, the predetermined difference criterion 316 is defined with respect to the signatures 304, as discussed in more detail below. For example, the predetermined difference criterion 316 can define a threshold for difference between training data streams 114 or signatures 304 thereof above which two training data streams 114 will be considered distinct.

In some examples, the training set 308 and the validation set 312 can be disjoint (i.e., no individual training data stream 114 is in both the training set 308 and the validation set 312), but this is not required. In some examples, fewer than 5% (or 10%, 15%, 25%, or 50%) of the training data streams 114 in the training set 308 are also in the validation set 312, or vice versa, or both.

In some examples, the preparation module 224 can cluster the training data streams 114 into two clusters, one cluster for the training streams 310 and the other cluster for the validation streams 314. Clustering can be performed using hierarchical clustering, k-means (e.g., 2-means) clustering, k-medoids (e.g., 2-medoids) clustering, or other clustering algorithms or techniques. In some examples, the preparation module 224 can select without replacement from the training data streams 114 and allocate each selected training data stream 114 to either the training set 308 or the validation set 312 based on differences between the signature 304 of the selected training data stream 114 and the signature(s) of the already-allocated training stream(s) 310 or validation stream(s) 314.

In some examples, the preparation module 224 computes a locality sensitive hash (LSH) or other signature 304 for each training data stream and allocates each stream to exactly one of the training set 304 or the validation set 312 so that there is no particular LSH value or other signature 304 common to streams in both sets 304, 312. In some examples, the preparation module 224 separates training streams 310 from validation streams 314 based on detection names derived using conventional anti-virus signatures. In some examples, related malware samples, e.g., as indicated by a common prefix in the detection name (e.g., "Burger" or "Silly"), can be placed entirely in the training set 304 or entirely in the validation set 312, rather than being split between the two sets 304, 312. In some examples, malware samples are named according to Computer Antivirus Research Organization (CARO) conventions, and sets of samples that share a CARO family name, or a family name plus variant name, are placed in their entirety in either training set 304 or validation set 312. In some examples, sets of samples sharing a product name, e.g., in the Portable Executable VERSIONINFO or other metadata, are placed in their entirety in either training set 304 or validation set 312.

In some examples, related malware samples can be placed primarily in the training set 304 or primarily in the validation set 312. For example, out of a group of related samples, the number of the samples in one of the training set 304 and the validation set 312 can be at most 25% of the number of the samples in the other of the training set 304 and the validation set 312 (or other percentages, e.g., 10%, 5%, or 1%). In any examples in this paragraph or the preceding discussion, beginning with operation 306, a set of samples considered to be similar can be apportioned so that at most a selected percentage of the samples is in one of the training set 304 and the validation set 312 and the remainder of the samples are in the other of the training set 304 and the validation set 312. Selected percentages can include, e.g., 1%, 5%, 10%, or 25%. Further examples of operation 306 are discussed herein with reference to at least one of FIG. 4, 6, 10, or 11, or to predetermined difference criterion 316.

In some examples, at operation 318, the training module 226 determines a CM 220 based at least in part on the training set 308. The CM 220 can be configured to take a signature 118 as input and provide a classification 120 as output. In some examples, the CM 220 can include a neural network, decision tree, decision forest, support vector classification, support vector regression, logistic regression, Gaussian process regression or other type of model described herein with reference to CM 112. For example, the training module 226 can perform stochastic gradient descent to train a neural network or decision tree, or can perform another computational-model determining process or algorithm discussed herein. In some examples, the training module 226 can perform minibatch-based training. In some examples, depicted using a dashed line, the training module 226 can run at least one training epoch, then validate using the validation set 312. Examples are discussed herein, e.g., with reference to operations 408-414, FIG. 4, or FIG. 8 or 10.

In some examples, at operation 318, the training module 226 (or the operation module 228, and likewise throughout this paragraph) can determine a plurality of partitions of the training set based at least in part on the signatures. Each partition of the plurality of partitions can include or consist of at least one of the data streams of the training set. The training module 226 can provide individual partitions of the plurality of partitions to respective computing nodes of a plurality of computing nodes via a communications interface 232 communicatively connected with the processing unit(s) 210. The training module 226 can receive respective results from individual computing nodes of the plurality of computing nodes. The training module 226 can then determine the CM based at least in part on the results. Examples are discussed herein, e.g., with reference to process 900, FIG. 9.

Throughout this disclosure, the term "node" refers to a device or portion of a device configured to perform functions described herein, e.g., neural-network training or other computational-model determination. In at least one example, training module 226 executes on each of a plurality of computing devices 200, and each computing device 200 has exactly one single-core processing unit 210. Each such computing device 200 is a node in this example. In some examples, training engine 202 executes on a single computing device 200 having a plurality of multi-core processing units 210. In such examples, each core of the multi-core processing units 210 represents a node. Other combinations, and points between these extremes, can also be used. For example, an individual processing unit 210, e.g., an accelerator such as an FPGA, can include or implement one or more nodes. In other examples, multiple cores of a processing unit 210 can be configured to operate together as a single node.

In some examples, at operation 320, the operation module 228 operates the CM 220 based at least in part on a trial data stream 116 to provide a trial model output 322. For example, the operation module 228 can determine a feature vector of the trial data stream 116 and apply the feature vector to the trained CM 220 to determine a classification 120 as the trial model output 322. In some examples, the trial model output 322 indicates whether the trial data stream 116 (e.g., executable instructions or data) is associated with malware. In an example in which the CM 220 includes a neural network, the operation module 228 can apply multiplication, summing, and activation functions to successive layers of the neural network, beginning with the feature vector applied as the input to a first layer of the neural network. In an example in which the CM 220 includes a decision tree, the operation module 228 can perform successive tests for specific characteristics of the feature vector while traversing the decision tree. Feature vectors can be determined, e.g., as described herein with reference to operation 502, feature vectors 504, operation 714, feature vectors 716, operation 1106, or feature vector 1108

Figure 4:
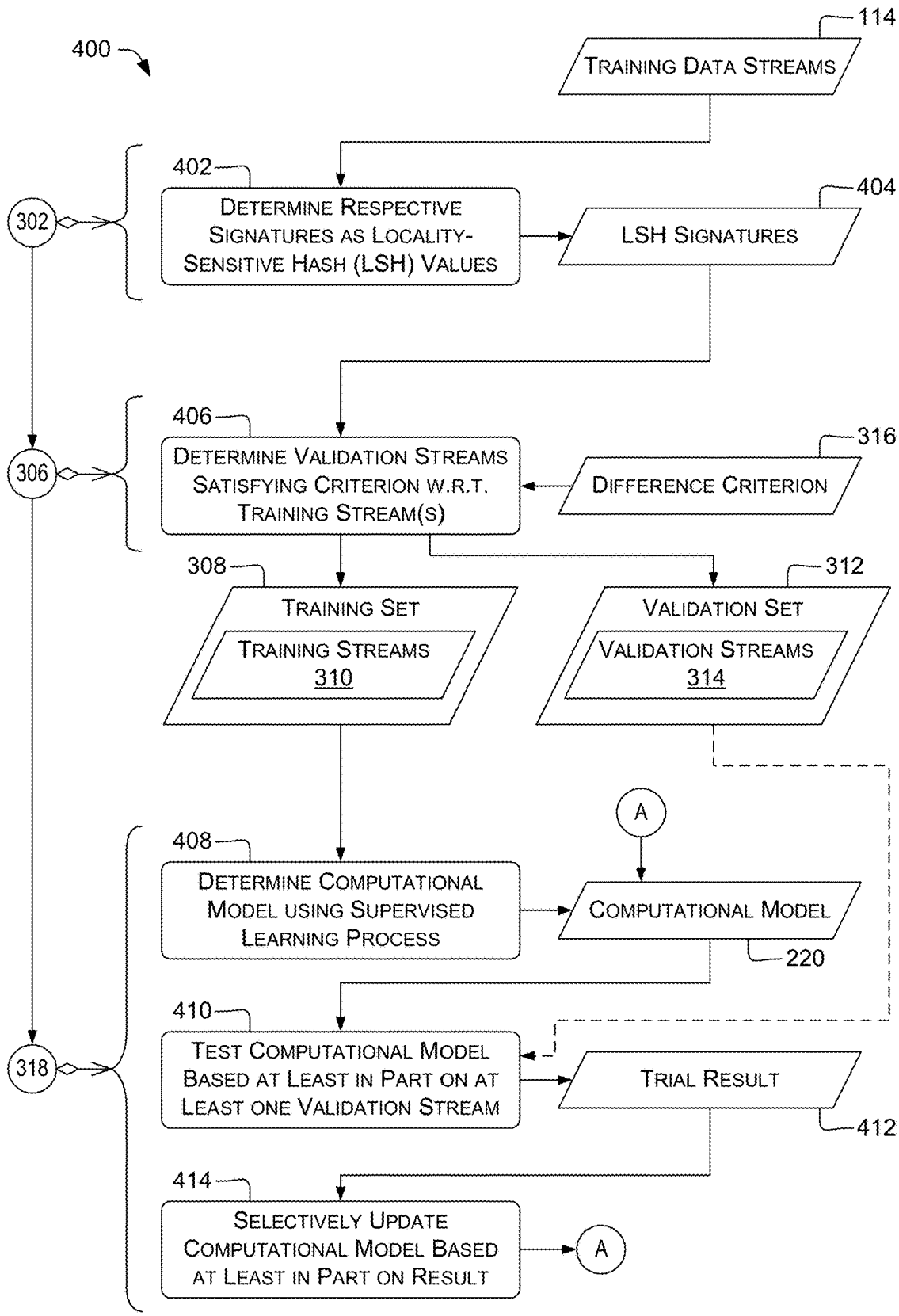
FIG. 4 is a dataflow diagram that illustrates example processes for determining or updating computational model(s) according to various examples described herein.

FIG. 4 is a dataflow diagram that illustrates an example process 400 for determining and operating CM(s), and related dataflow. In some examples, operation 302 can include operation 402. In some examples, operation 306 can include operation 406. In some examples, e.g., examples in which the CM 220 comprises a neural network (NN), decision tree, decision forest, or tree ensemble, operation 318 can include operations 408, 410, or 414. Each of the following groups of operations can be used in combination with other(s) of the groups or independently: (1) 402, (2) 406, or (3) 408, 410, and 414.

In some examples, at operation 402, the representation module 222 determines at least some of, or all of, a plurality of LSH signatures 404 as LSH values associated with the respective training data streams 114. LSH signatures 404 can represent signatures 304. For example, the LSH signatures 404 can include or consist of LSH values computed based on bit(s) of the training data streams 114 or on feature vectors that are themselves determined based on bit(s) of the training data streams 114. Further examples of feature vectors are discussed below with reference to FIG. 5.

In some examples, the LSH process for a given training data stream 114 takes as input a vector of values, e.g., numerical values, associated with (e.g., of or determined based at least in part on) that training data stream 114. The representation module 222 computes the dot products of the input vector with multiple weight vectors. The concatenated signs of the resulting dot products form a hash value for the input vector. This is an example of an LSH technique known as $E^2LSH$. The weight vectors can be determined, e.g., by selecting vector elements randomly (or pseudorandomly, and likewise throughout this document). Other LSH techniques, which can be used singly or in combination with other techniques, can include lattice LSH, spherical LSH, or other $f_p$-distance based LSH techniques; $E^2LSH$, kernel LSH, or other angle-based LSH techniques; Hamming-distance based LSH techniques; min-hash, K-min sketch, or other Jaccard-coefficient based LSH techniques; chi-squared-based LSH techniques; winner-take-all hashing; or shift-invariant kernel hashing.

In some examples, the LSH process for a giving training data stream 114 can including determining a "peHash" hash or pre-hash, or other hash determined based at least in part on, or including or representing, portions or characteristics of the training data stream 114 selected by a security analyst. The peHash algorithm determines a hash as a SHA-1 hash of a pre-hash (also referred to as a "hash buffer"). The pre-hash can include values determined from fields of a PE file's header and the file's section headers, including the file's flags, subsystem identifier, stack commit size, and heap commit size, and each section's virtual address, raw size, and section characteristics. The number of bits of each field used can be limited to, e.g., between eight and 32 to increase locality-sensitivity. This is not limiting, and other amounts of data can additionally or alternatively be used, e.g., >100 bytes, >200 bytes, 512 bytes, one kilobyte, or larger buffers. The pre-hash can additionally or alternatively include a binned compression ratio of each section indicating the entropy of that section. In some examples, the LSH signatures 404 or other signatures 304 can include at least one of the above types of data of a pre-hash, or cryptographic hashes of pre-hashes including any of the above types of data.

In some examples, at operation 406, the preparation module 224 determines the validation set 312 including validation streams 314 of the plurality of training data streams 114 that satisfy the predetermined difference criterion 316 with respect to training stream(s) 310 in the training set 308. Examples are discussed herein, e.g., with reference to operation 306. For example, the preparation module 224 can select at least some training stream(s) 310, then select validation streams 314 that are distant from those training stream(s) 310 as measured by the predetermined difference criterion 316. For clarity of explanation, without limitation, some examples herein are given for which an LSH hash code is an f-dimensional bit string.

In some examples, the predetermined difference criterion 316 can be satisfied between two training data streams 114 α and β if any, or any combination, of the following hold. Throughout this paragraph and the next paragraph, examples of LSH has codes are used for brevity. However, techniques herein can additionally or alternatively be used for types of signatures 304 other than LSH hash codes. Criterion 316 can be satisfied, e.g., when: α and β are in different LSH hash buckets (or bins); α and β have respective, different LSH hash codes (or other signatures 304) $α_c$ and $β_c$; or $α_c$ is in a hash bucket including only, or over 50%, training streams 310 and $β_c$ is in a hash bucket including only, or over 50%, validation streams 314 (e.g., for impure hash buckets).

In some examples, the predetermined difference criterion 316 can be satisfied if a, and $β_c$ are spaced apart from each other by at least a predetermined distance in an evaluation space or metric. Example evaluation spaces or metrics can include Euclidian, Manhattan, or other distances in an f-dimensional space; Hamming distance or Jaccard distance; or angle between the vectors $\vec{α_c - 0}$ and $\vec{β_c - 0}$. In some examples, the predetermined difference criterion 316 can be satisfied if $α_c$ and $β_c$ (or numeric representations thereof, such as length) fall in separate quantization bins, the level of quantization defined by the predetermined difference criterion 316.

In some examples, at operation 408, the training module 226 performs a supervised learning process to determine the CM 220. The supervised learning process can use at least one training stream 310 of the training set 308 as training data. Examples are discussed herein, e.g., with reference to operation 318. In other examples, an unsupervised learning process can additionally or alternatively be used. In some examples, each training stream 310 is associated with a classification 120. The training module 226 can determine the CM 220 to output classifications 120, e.g., with at least a predetermined level of accuracy, for the training streams 310.

Some CMs are subject to overfitting, an effect by which the training increases the accuracy of the CM on the specific training data provided, at the expense of the model's ability to generalize or correctly process new samples. For example, consider a CM being trained to classify malware. There are various high-level categories of malware, such as spyware, adware, ransomware, and botnet software. Within each category, there may be numerous families of malware. For example, some families of ransomware lock the user interface of an infected computer, e.g., until a ransom is paid. Other families of ransomware encrypt files on an infected computer using an encryption key known only to the adversary. Still other families encrypt files on any network drives connected to an infected computer. Some families may combine characteristics of multiple of these families, and adversaries continue to develop new families of ransomware and other malware. The widespread availability of high-speed Internet connections and powerful computers has increased the use of malware variants by unskilled adversaries as well as by sophisticated adversaries. Therefore, a CM that is trained and overfit to distinguish between specific families of ransomware may not correctly classify new families of ransomware, and may even fail to identify malware from such families as ransomware.

To reduce the probability of overfitting, the CM 220 can be tested using the validation set 312. Even if the CM 220 is very accurate on the training set 308, it may be necessary to retrain or adjust the CM 220 if it is not very accurate on the validation set 312. In some examples, to permit determining accuracy during validation, each validation stream 314 is associated with a classification 120.

In some examples, at operation 410, the training module 226 (or the operation module 228) tests the determined CM 220 based at least in part on at least one validation stream 314 of the validation set 312 (depicted using a dashed arrow). Operation 410 produces a trial result 412. Examples are discussed herein, e.g., with reference to operation 320. For example, the training module 226 can apply the at least one validation stream 314 to the CM 220 to determine a classification 120. The classification 120, or an indication of whether the classification 120 was accurate, can then be included in the trial result 412.

In some examples, at operation 414, the training module 226 selectively updates the CM 220 based at least in part on a result of the testing (operation 410). For example, if the trial result 410 indicates that the accuracy of the CM 220 is consistent between the training set 308 and the validation set 312, training can continue, and the training module 226 can update the parameters of the CM 220 as discussed herein with reference to operation 408.

In some examples, operations 408-414 can be repeated as long as accuracy on the validation set 312 is improving as training proceeds, as indicated by the trial result 412, and can terminate when accuracy on the validation set 312 ceases to improve as training proceeds. Using operations 408-414 can permit detecting overfitting, e.g., when accuracy on the validation set 312 ceases to improve. Avoiding overfitting using techniques of process 400 can permit determining CMs 220 that have a higher probability of determining the category of malware, even for malware families not represented in the training data streams 114 ("unseen samples"). Some examples herein can also improve the determination probability on unseen samples for CMs 220 configured to provide model outputs other than malware category, e.g., malware type, malware family, or adversary identity (individual or group).

Using ransomware as a nonlimiting example, even if the training data streams 114 do not include ransomware of the cookie-monster family, a CM 220 trained using process 400 or other example processes herein may nevertheless be able to identify a cookie-monster malware sample as being in the ransomware category. In some examples, such a CM 220 may also be able to identify, via a field in classification 120, that the cookie-monster sample is not of a known family of ransomware. This can permit early detection of new families of ransomware or other malware, which can in turn permit mitigating deleterious effects of malware belonging to those new families more rapidly and effectively.

Figure 5:
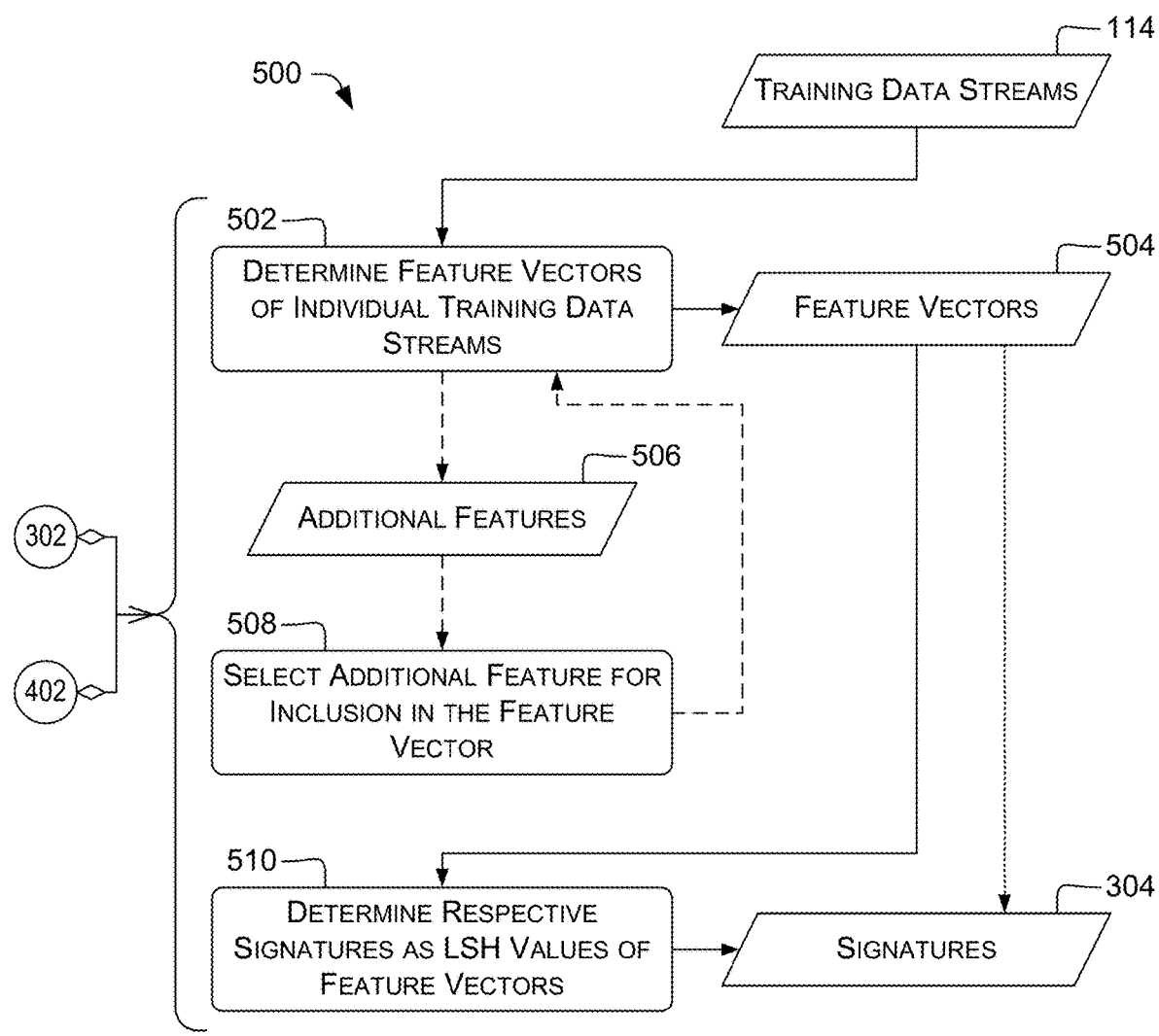
FIG. 5 is a dataflow diagram that illustrates example processes for determining signatures of data streams according to various examples described herein.

FIG. 5 is a dataflow diagram that illustrates an example process 500 for determining and operating CM(s), and related dataflow. In some examples, operation 302 or operation 402 can include operation 502 or operation 510. In some examples, operation 302 or operation 402 can include operation 508.

In some examples, at operation 502, the representation module 222 determines respective feature vectors 504 of the individual training data streams 114. For example, representation module 222 can operate a feature extractor, such as a previously-trained CM or a hand-coded feature extractor, on bit(s) of a training data stream 114 to provide the feature vector 504. In some examples, the feature extractor can determine additional features 506 that are not included in the feature vector 504.

In some examples, the representation module 222 can determine at least one of the features listed in Table 2 with respect to a training data stream 114. For brevity, the symbol Σ in the Table 2 refers to the training data stream 114 or portion(s) thereof as may be determined or processed by the representation module 222. The listed features can be included in feature vector 504 or can be additional features 506.

autoencoder can provide a number of float values, e.g., 20 float values, that are the outputs of a hidden layer, e.g., as discussed above. A feature in a feature vector 504 can then include or consist of those 20 float values (or other value(s) provided by the autoencoder), or a portion thereof.

In some examples, at operation 508, the representation module 222 can select at least one additional feature 506 for inclusion in the feature vector 504, as depicted by the dashed arrows. The representation module 222 can, e.g., add the at least one additional feature 506 to the feature vector 504 immediately. The representation module 222 can additionally or alternatively update stored information, e.g., in CRM 214, so that the at least one additional feature 506 will be included in the feature vector 504 upon future performance of operation 502.

In some examples, the representation module 222 can select the at least one additional feature 506 providing at least a predetermined number of bits of entropy, e.g., at least three bits or at least n bits, n≥3. This can permit expressing finer distinctions between data streams than can binary-valued features or other features providing only a small number of possible values.

TABLE 2

| Feature |
| --- |
| Entropy of Σ |
| Entropy of a segment or other portion(s) of Σ, e.g., a TEXT or DATA segment |
| Entropy of a subset of Σ, e.g., of multiple sections |
| Character(s) or symbol(s), or hash(es) or other representation(s), of human-readable text ("printable strings") included in Σ |
| Number of printable strings in Σ |
| Flags or other values of standardized headers in Σ, e.g., the MZ or PE headers or the DLL import table of a WINDOWS executable file 122 |
| Flags or other values of other headers or structures in Σ, e.g., comp. id values found in the Rich header in a WINDOWS executable file 122 |
| Contents of Σ, e.g., ten (or another number of) bytes at the entry point or the beginning of main( ) in an executable file 122 |
| Output(s) of an autoencoder (as discussed below) when provided Σ as input, e.g., when provided bytes at the entry point |
| Size of Σ (e.g., in bytes) |
| SHA-256 or other cryptographic hash value(s) of at least portion(s) of Σ, e.g., of headers, individual sections, metadata, version information, or icons, text, fonts, audio, graphics, or other content assets embedded or included in Σ. |
| File type of Σ, e.g., as output by pefile, PEiD, TrID, or file(1) |

As noted in Table 2, one example feature is output(s) of an autoencoder. An autoencoder can include, e.g., a deep neural network, trained to produce output substantially equal to its input. Neural-network autoencoders generally include at least one hidden layer having fewer outputs than the number of inputs. As a result, the outputs of the hidden layer are a representation of the input, and that representation has lower dimensionality than the input itself. This reduction in dimensionality can provide information about the structure of the input or of a class of related inputs. In some examples, the autoencoder is a denoising autoencoder. The denoising autoencoder is trained to produce output substantially equal to a reference, when the training inputs to the neural network are portions of, or partly-corrupted versions of, the reference. The lower-dimensional hidden-layer outputs of a denoising autoencoder can provide information about the input that is robust to minor variations, such as may be introduced by adversaries to render their malware more difficult to detect.

In an example, an autoencoder can receive a one-hot or other encoding of a number of bytes of Σ, e.g., 2560 bits of input that are a one-hot encoding of ten bytes of Σ or a portion thereof. The bytes can include or consist of, e.g., bytes beginning with the byte at the entry point. The In some examples, the representation module 222 can select the at least one additional feature 506 based at least in part on performance on a desired task of the CM. For example, a CM 220 configured to determine whether a trial data stream 116 is associated with malware can be evaluated based on a corpus of known samples to determine the accuracy of the CM 220. If CM 220 meets a predetermined accuracy criterion, the CM 220 can be inspected to determine which inputs are significant contributors to the (sufficiently accurate) results provided by the CM 220. For example, Garson's or Goh's algorithms can be used to determine, based on the weights of a neural network, which inputs of that neural network have the most significant role in determining a particular output of that neural network. The Lek profile method can determine the sensitivity of particular outputs of a neural network to changes in particular inputs of that neural network.

In some examples, e.g., using decision trees, ensembles, or forests, information gain algorithms can be used to determine changes in the mutual information of node(s) of tree(s) over the course of training, e.g., as in RANDOM FORESTS. Gradient-boosted tree-ensemble training can take into account leaf weights when determining the importance of an input to the output of the ensemble, e.g., as in xgboost. Accordingly, the training module 226 can provide to the representation module 222 mutual-information data, leaf weights, or other values useful in determining relative effect on the outputs of various features. The representation module 222 can then select for inclusion the at least one additional feature 506 having, e.g., the most significant relative effect among the additional features 506.

Accordingly, in some examples, the representation module 222 (or other modules herein) can include candidate feature(s) of the additional features 506 in a CM and train that CM until it meets the predetermined accuracy criterion. The representation module 222 can then use the above techniques to select as the at least one additional feature 506 at least one of the candidate feature(s) strongly associated with or otherwise significantly responsible for the accuracy of the trained CM.

In some examples, at operation 510, the representation module 222 determines the signatures 304 based on the respective feature vectors 504. For example, representation module 222 can determine the signatures 304 as the LSH values of the respective feature vectors 504. Examples of LSH are discussed herein, e.g., with reference to operation 402. Some examples in which locality-sensitive hashes of feature vectors 504 are used as representations of the respective data streams 114, 116 can permit grouping training data streams 114 in semantically-meaningful ways with the use of considerably fewer computational resources than prior schemes such as exhaustive pairwise comparison. For example, hashing the training data streams 114 using LSH can permit readily determining similar training data streams 114 and avoiding dividing those similar training data streams 114 between the training set 308 and the validation set 312. This can in turn reduce the risk of overfitting of CM 220, as discussed above. In some examples of operation 306, training data streams 114 allocated to a particular LSH bin are included entirely in the training set 308 or entirely in the validation set 312, and are not allocated some to the training set 308 and some to the validation set 312.

In some examples, the representation module 222 can determine LSH hash values using angular-distance (dot product)-based LSH. Such a hash value, in some examples, is a concatenation of n bits $b_n$. Each bit $b_n$ is determined from a respective one of n integer or float values $v_n$, e.g., by thresholding $v_n$. For example, $b_n$ can be 1 if $v_n \geq 0$ and 0 otherwise. Each value $v_n$ can be a dot product of a signature vector S, e.g., a signature 304 such as a feature vector 504, with a respective weight vector $W_n$.

In some examples, the representation module 222 can determine LSH hash values using sparse LSH techniques. In some examples, e.g., using the notation of the previous paragraph, the representation module 222 can compute the bits $b_n$ based on respective modified values $m_n$. Each modified value $m_n$ can be computed using a dot product, but with a modified weight vector $U_n$ (e.g., a "sparse LSH weight vector") instead of with weight vector $V_n$. Each modified weight vector $U_n$ can be determined by copying $W_n$ to form $U_n$, then randomly modifying elements of $U_n$ with a probability of modification p. For example, the $i^{th}$ element of $U_n$ can be set to zero, unity, or another predetermined value if $d_i < p$ for a respective random draw $d_i$ from a uniform distribution on the range [0,1].

Using sparse LSH techniques can provide benefits similar to the benefits of denoising autoencoders. For example, using sparse LSH techniques can reduce the likelihood that a CM 220 will overfit to particular features to the exclusion of other features. Using sparse LSH techniques can therefore improve the ability of CM 220 to generalize to trial data streams 116 different from the training data streams 114 used in determining the CM. Accordingly, in some examples, operation 510 can include determining sparse LSH weight vectors $U_n$ and determining the signatures 304 as the LSH values of the respective feature vectors 504 based at least in part on the sparse LSH weight vectors $U_n$.

In other examples, as depicted by the stippled arrow, the signatures 304 can include or consist of the respective feature vectors 504 or subsets thereof. For example, the predetermined difference criterion 316 can specify a threshold distance above which two feature vectors 504 or respective subsets thereof will be considered distinct. Such a threshold distance can be a Euclidean, Hamming, angular, or other distance described herein.

Figure 6:
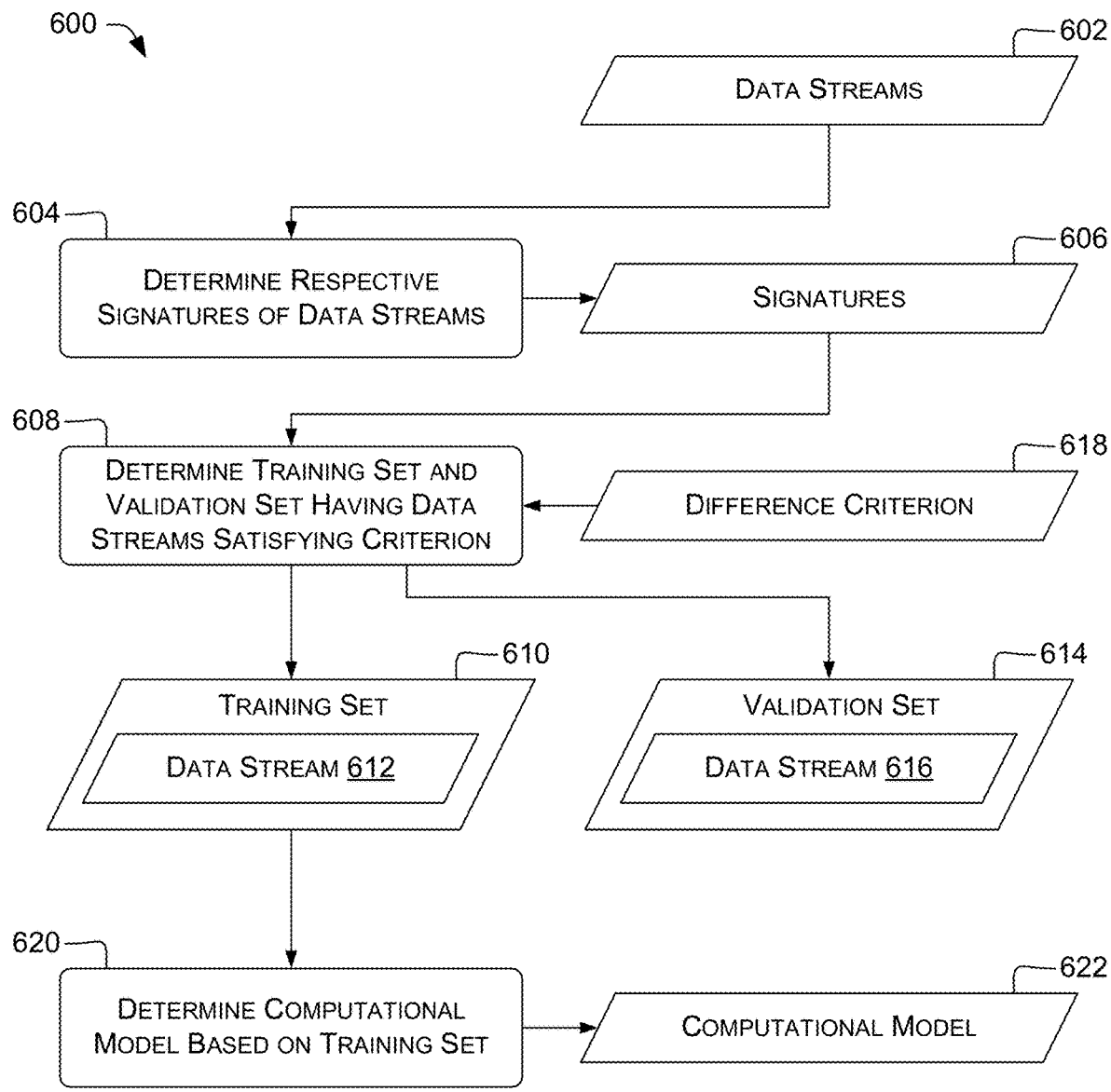
FIG. 6 is a dataflow diagram that illustrates example processes for determining computational model(s) according to various examples described herein.

FIG. 6 is a dataflow diagram that illustrates an example process 600 for determining and operating computational model(s), and related dataflow. Process 600 can be carried out, e.g., under control of at least one processing unit 210. Process 600 can take as input data streams 602, e.g., of a plurality of data streams. Data streams 602 can represent training data streams 114, FIG. 1.

In some examples, at operation 604, the representation module 222 determines signatures 606 of respective data streams 602. Examples are discussed herein, e.g., with reference to at least one of operation 302 or FIG. 4, 5, or 7.

In some examples, at operation 608, the preparation module 224 determines, based at least in part on the signatures 606, a training set 610 comprising at least one data stream 612 of the data streams 602 and a validation set 614 comprising at least one data stream 616 of the data streams 602. Examples are discussed herein, e.g., with reference to operation 306. In some examples, the preparation module 224 determines the training set 610 and the validation set 614 so that the training set is disjoint from the validation set, e.g., as discussed above.

In some examples, the respective signatures 606 of a data stream 612 of the training set 610 and a data stream 616 of the validation set 614 satisfy a predetermined difference criterion 618. In some examples, the validation set 614 includes at least some elements different from the training set 610. For example, the preparation module 224 can determine the validation set 614 including individual data streams 616 that satisfy the predetermined difference criterion 618 with respect to at least some of the data streams 612 in the training set 610. Examples are discussed herein, e.g., with reference to predetermined difference criterion 316.

In some examples, at operation 620, the training module 226 determines a computational model (CM) 622, e.g., including a neural network, decision tree, or tree ensemble, based at least in part on the training set 610. Examples are discussed herein, e.g., with reference to operation 318.

In some examples, operation 620 can include, before determining the CM 622, arranging the training set 610 and the validation set 614 in respective, different regions of a computer memory 212 communicatively connected with the processing unit(s) 210. This can improve the locality of data streams 602 during the determination of the CM 622, which can reduce cache misses and therefore improve the speed of power efficiency of the model determination (operation 620).

Figure 7:
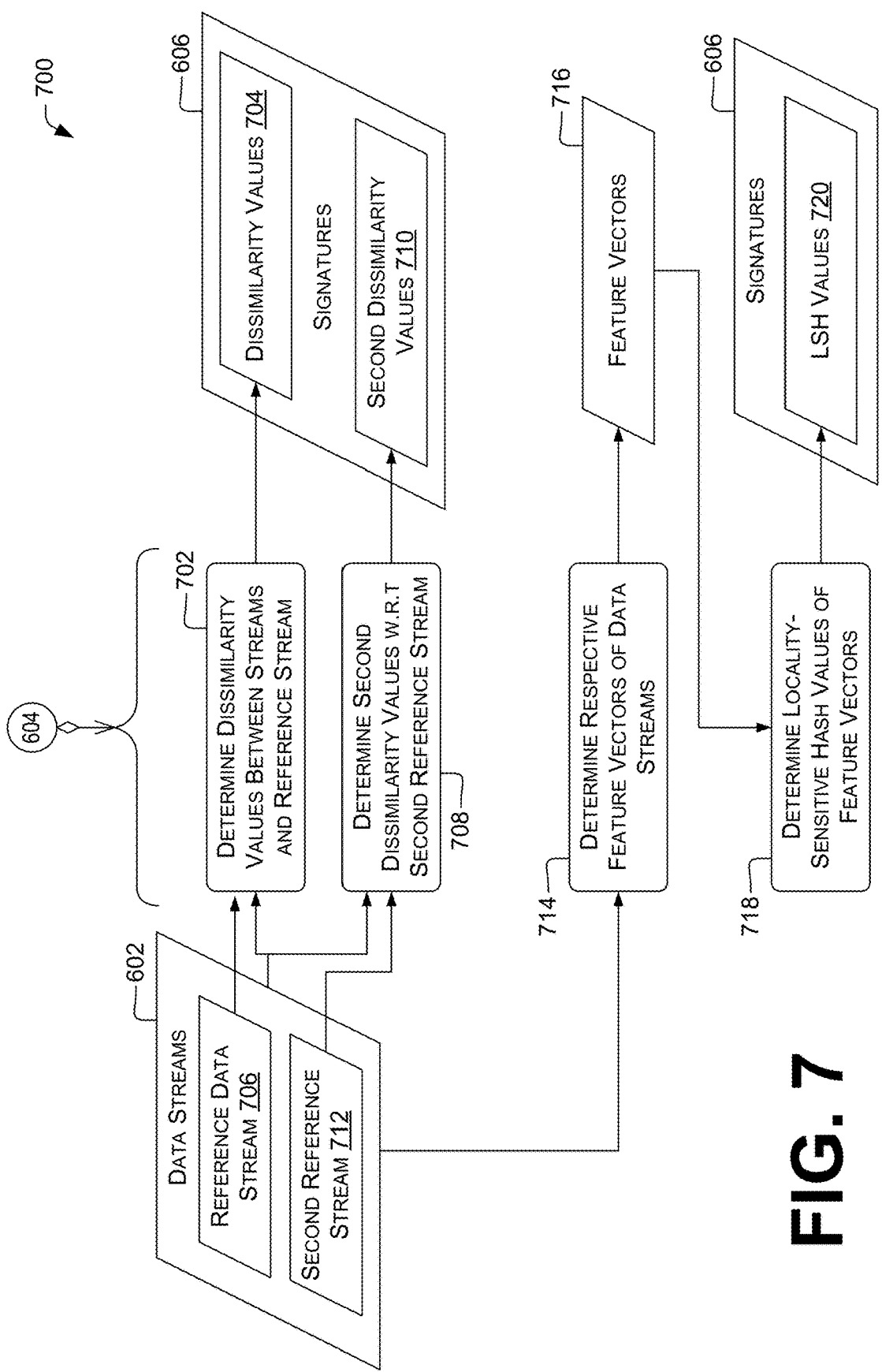
FIG. 7 is a dataflow diagram that illustrates example processes for determining signatures for use in determining computational model(s) according to various examples described herein.

FIG. 7 is a dataflow diagram that illustrates an example process 700 for determining CM(s), and related dataflow. In some examples, operation 604 can include operations 702 and 708. In some examples, operation 604 can include operations 714 and 718.

In some examples, at operation 702, the representation module 222 determines the signatures 606 comprising respective dissimilarity values 704 between the respective data streams 602 and a common reference data stream 706 of the data streams 602. The reference data stream 706 can be selected, e.g., randomly, based on selection by entity 110, or (e.g., for full intercomparison of each possible pair of data streams 602) as the next data stream 602, when the data streams 602 are taken in turn as common reference data streams 706. Operation 702 can include, e.g., one-to-many pairwise comparisons of the data streams 602 to determine the signatures 606, based on which the training set 610 and the validation set 614 can be determined as discussed herein with reference to operation 608.

In some examples, an individual dissimilarity value 704 can include at least one of: a Hamming distance between at least part of the respective data stream 602 and at least part of the reference data stream 706; a dot product or other angular distance, a Euclidean distance, or another distance measure between a first vector including at least some bits of the respective data stream 602 and a second vector including at least some bits from the reference data stream 706; a comparison between a value in the respective data stream 602 and a corresponding value in the reference data stream 706 such as a difference between two float values; a true/false indication of whether the data stream 602 and the reference data stream 706 differ, or any of the above measures with respect to respective hashes (e.g., SHA-256, E²LSH, ssdeep, peHash, or other hashes described herein) or other representations of at least a portion of the respective data stream 602 and at least a portion of the reference data stream 706.

In some examples, at operation 708, the representation module 222 determines the signatures 606 further comprising respective dissimilarity values 710 between the respective data streams 602 and a common second reference data stream 712 of the data streams 602. The common second reference data stream 712 can be different from the common reference data stream 706. The common second reference data stream 712 can be determined as described herein with reference to the reference data stream 706. For example, each data stream 602 in turn can be selected to be the common second reference data stream 712. Examples of dissimilarity values are discussed herein, e.g., with reference to operation 702.

In some examples, operation 708 can include determining any number of values of or in signatures 606, e.g., based on respective pairwise comparisons of data streams 602, e.g., up to the N(N−1)/2 such possible pairs that can be made from a set of N data streams 602. Operation 708 can therefore include or permit, e.g., performing many-to-many pairwise comparisons of the data streams 602 to determine the signatures 606. In some examples, signatures 606 can be columns (or rows) of a dissimilarity matrix, or other vectors, e.g., sparse or dense vectors, showing the results of the pairwise comparisons.

In some examples, at operation 714, the representation module 222 determines respective feature vectors 716 of at least some of the data streams 602. Examples are discussed herein, e.g., with reference to operations 402 and 502.

In some examples, at operation 718, the representation module 222 determines the signatures 606 comprising locality-sensitive hash (LSH) values 720 of the respective feature vectors 716. Examples are discussed herein, e.g., with reference to operations 402 and 510. In some examples using sparse LSH techniques, operation 718 can include determining sparse LSH weight vectors and determining the signatures 606 as the LSH values 720 of the respective feature vectors 716 based at least in part on the sparse LSH weight vectors. Examples are discussed herein, e.g., with reference to operation 510.

Figure 8:
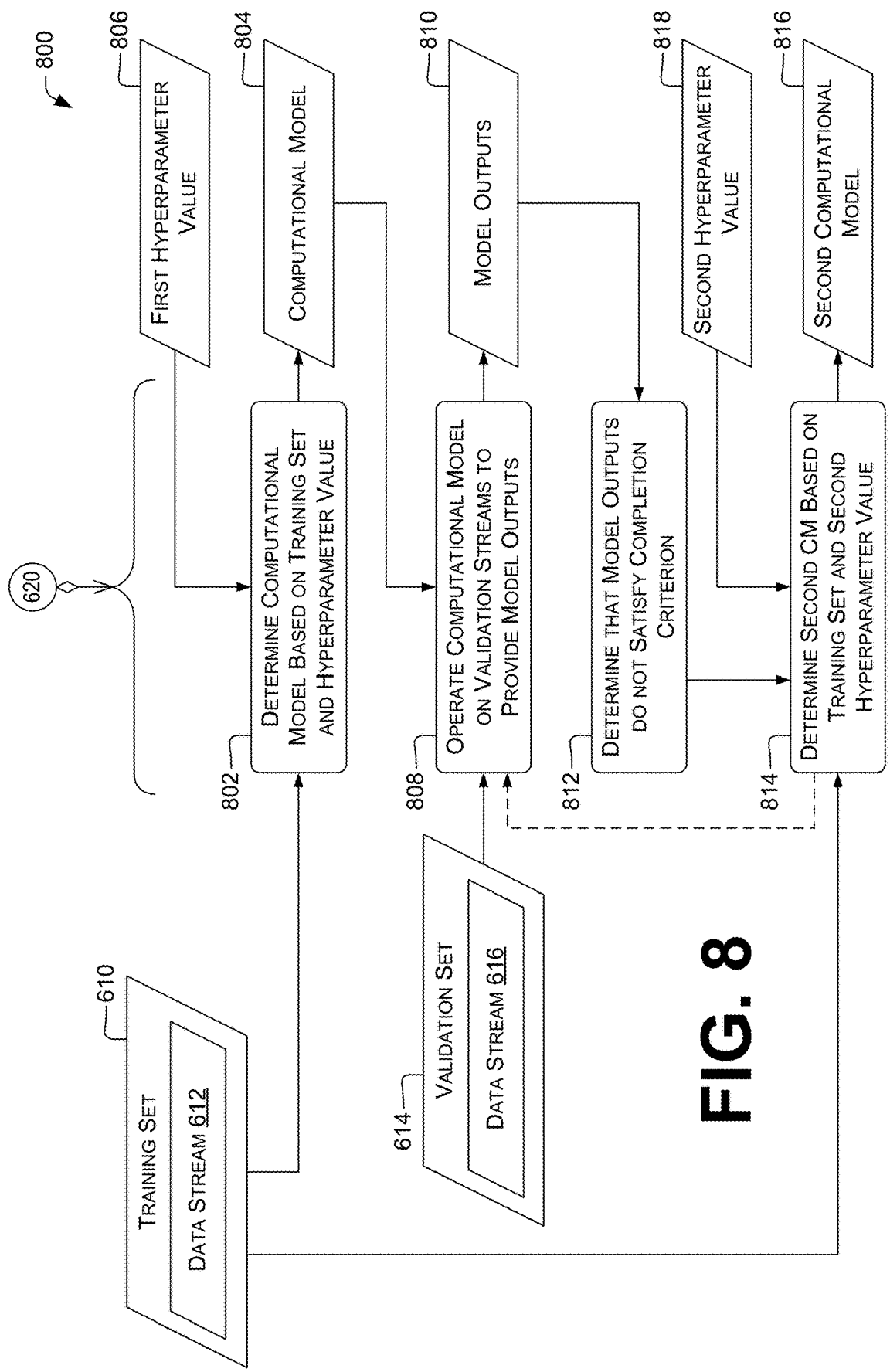
FIG. 8 is a dataflow diagram that illustrates example processes for determining or updating computational model(s) according to various examples described herein.

FIG. 8 is a dataflow diagram that illustrates an example process 800 for determining and operating CM(s), and related dataflow. In some examples, operation 620 can include operations 802, 808, 812, or 814. Process 800 can include successively determining two CMs 804 and 816, each of which can represent CM 622. For example, process 800 can be used as part of an iterative training technique to determine CM 622. Each CM 804, 816 can be determined based at least in part on respective, different hyperparameter values, as described below. This can provide improved performance of CM 622, as described herein, compared to some prior training techniques using only one hyperparameter value or value set for training.

In some examples, at operation 802, the training module 226 determines a CM 804, which can represent CM 622, further based at least in part on a first hyperparameter value 806. Examples of training are discussed herein, e.g., with reference to operation 620. Examples of hyperparameters are discussed herein, e.g., with reference to training module 226. For example, the first hyperparameter value 806 can include a learning rate or momentum. In some examples, the first hyperparameter value 806 can include a tuple or other collection, e.g., of float values, or other scalar or compound value(s).

In some examples, at operation 808, the training module 226 (or the operation module 228, and likewise throughout the following operations of process 800) operates the CM 622 based at least in part on at least some of the data streams 616 of the validation set 614 to provide respective model outputs 810.

In some examples, at operation 812, the training module 226 determines that the model outputs 810 do not satisfy a predetermined completion criterion (or, equivalently, do satisfy a predetermined continuation criterion). Examples are discussed herein, e.g., with reference to operation 410. In response to the determination at operation 812, the training module 226 can perform operation 814.

In some examples, at operation 814, the training module 226 determines a second CM 816 based at least in part on the training set 610 and a second hyperparameter value 818, e.g., a float value or tuple, different from the first hyperparameter value 806. In some examples in which the first hyperparameter value 806 and the second hyperparameter value 818 are tuples, the first hyperparameter value 806 and the second hyperparameter value 818 can differ in at least one corresponding element. The second CM 816 can represent CM 622. The second CM 816 can be determined as discussed herein with reference to, e.g., operation 802, operation 620, or operation 318. In some examples, the training module 226 can determine the second hyperparameter value 818 based at least in part on the first hyperparameter value 806. In some examples, the training module 226 can determine the second hyperparameter value 818 based at least in part on at least one of the model outputs.

In some examples, depicted by the dashed arrow, operation 814 can be followed by operation 808 to determine model outputs 810 of the second CM 816. Process 800 can include iterating, e.g., using a mathematical optimization technique, to determine hyperparameter value(s) that will provide a CM 622 whose outputs (e.g., accuracy of malware identification) satisfy the predetermined completion criterion. Any of the mathematical optimization techniques described herein can be used in determining the second hyperparameter value 818 or subsequent hyperparameter values, e.g., techniques such as gradient descent. Additionally or alternatively, techniques such as grid search or other searching techniques can be used to explore the hyperparameter space to determine hyperparameter values. In some examples, using mathematical techniques to traverse the hyperparameter space can provide a classifier, e.g., a malware/non-malware classifier, that performs effectively or that most effectively generalizes to new malware families or other data beyond the training set 610.

Figure 9:
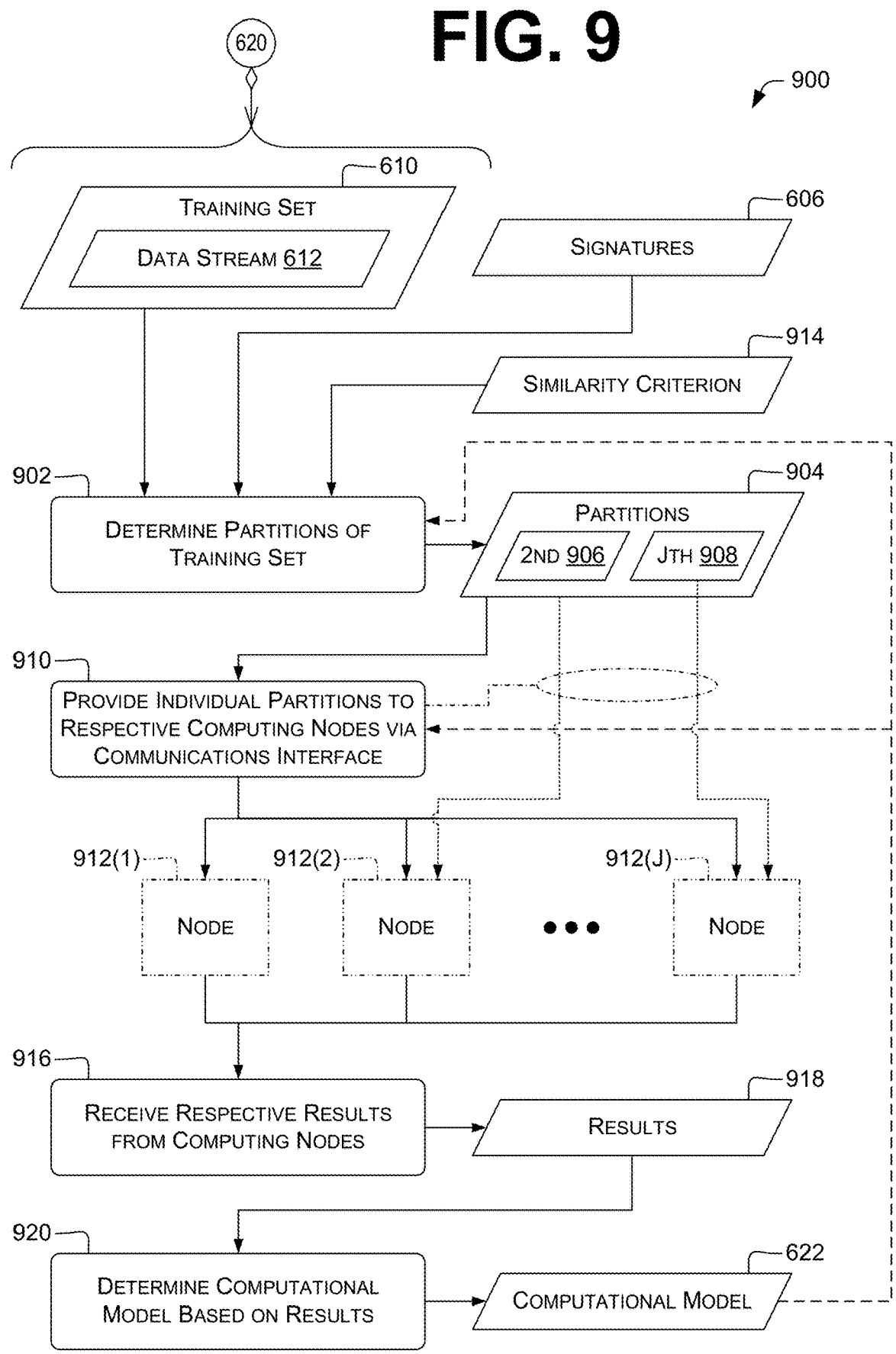
FIG. 9 is a dataflow diagram that illustrates example processes for determining computational model(s) using multi-node processing according to various examples described herein.

FIG. 9 is a dataflow diagram that illustrates an example process 900 for determining and operating CM(s), and related dataflow. In some examples, operation 620 can include operations of process 900. In some example of process 900 and in other examples, neural-network training or other computational-model determination can be performed by multiple nodes in a parallel manner to reduce the time required for training.

In some examples, at operation 902, the training module 226 (or the preparation module 224 or the operation module 228, and likewise throughout the following discussion of process 900) determines a plurality of partitions 904 of the training set 610 based at least in part on the signatures 606. Each partition 904 of the plurality of partitions 904 comprises at least one of the data streams 612 of the training set 610. The illustrated partitions 904 are a second partition 906 and a $J^{th}$ partition 908, discussed below with reference to nodes 912.

In some examples, at operation 910, the training module 226 provides individual partitions 904 of the plurality of partitions 904 to respective computing nodes 912 of a plurality of computing nodes 912(1)-912(J) (shown in phantom) (individually and/or collectively referred to herein with reference 912), where J is any integer greater than and/or equal to 1, via a communications interface 232. The training module 226 can provide the partitions 904, e.g., by transmitting data of at least some of the individual partitions 904 to the respective computing nodes 912 via, e.g., a memory or network interface communicatively connected with the processing unit(s) 210 (e.g., a processor). This can permit the computing nodes 912 to process the respective partitions 904 in parallel, which can reduce the amount of time required to determine the CM 622. In the illustrated example, as depicted by the dotted lines and dash-dot indicator, the training module 226 provides the second partition 906 to node 912(2) and the $J^{th}$ partition 908 to node 912(J).

In some examples, operation 910 can be performed more than once, as depicted by the dashed arrow and discussed below. In some of these examples, the second and subsequent performance of operation 910 can include transmitting a command to at least one node 912 to begin processing using data previously transmitted. For example, the nodes 912 can retain local copies of their respective partitions 904 and perform computations repeatedly on those copies.

In some examples of a multiple-node computational-model-determining system (e.g., having separate memory banks per node), the training set 610 can be divided into the partitions 904 based at least in part on the signatures 606 to determine CMs 622 to achieve specific objectives. In some examples, each partition 904 can include or consist of similar files (or other data streams, and likewise throughout this paragraph) to permit each node to train on specific traits. In some examples, each partition 904 can include a diverse set of data streams (e.g., having respective, different signatures) so that each node contributes to determining a CM 622 in view of the context provided by the whole training set 610 or a broad subset thereof.

In some examples, each partition 904 (or at least some of the partitions 904, and likewise throughout the discussion of operation 910) can include or consist of similar data streams 612. This can permit the respective nodes 912 to train on specific traits that are effectively reflected in the training set 610. In some of these examples, at operation 910, the training module 226 can determine a first partition, e.g., partition 906 (or some, or all partitions) of the plurality of partitions 904 based at least in part on a predetermined similarity criterion 914. In some examples, the respective signatures 606 of a majority of the data streams in the first partition satisfy the predetermined similarity criterion 914 with respect to each other. Similarity comparisons can be made between data streams 612 or signatures 606. Similarity comparisons can include pairwise comparisons, hashing and hash-bin comparisons, or other comparisons.

In some examples, each partition 904 can include or consist of a diverse set of data streams 612, e.g., data streams 612 having signatures that differ from each other. This can permit more improving model training speed while retaining understood behavior, e.g., of minibatch-based training techniques. In some of these examples, at operation 910, the training module 226 can determine a first partition, e.g., partition 906 of the plurality of partitions 904 based at least in part on the predetermined similarity criterion 914. In some examples, for any majority of the data streams 612 in the first partition, the respective signatures 606 of the data streams 612 in that majority do not satisfy the predetermined similarity criterion 914 with respect to each other, as determined using pairwise comparisons, hashes, or other comparison techniques described herein. In some examples, no partition 904 has more than 50% data streams 612 that are grouped together by the predetermined similarity criterion 914.

In some examples, at operation 916, the training module 226 receives, e.g., via communications interface 232, respective results 918 from individual computing nodes 912 of the plurality of computing nodes 912. For example, the results can include at least one of: a parameter value, a parameter-gradient value, e.g., with respect to a loss, cost, or value function; or an output of part or all of the CM for a specific input. In some examples using gradient descent to train neural networks, the results 918 from each respective node 912 can include gradients determined based on the respective partitions 904.

In some examples, at operation 920, the training module 226 determines the CM 622 based at least in part on the results 918. For example, the training module 226 can determine an overall gradient, e.g., as an average or other combination of gradients included in the results 918, and then can update parameter values of the CM 622 based on the overall gradient, e.g., using backpropagation.

In some examples, as depicted by the dashed arrows, operation 920 can be followed by operation 902 or operation 910. These examples can permit iteratively updating CM 622, e.g., during a mathematical-optimization training process.

In some examples, neural networks are trained using minibatch-based stochastic gradient descent (SGD) techniques. SGD can be parallelized along three dimensions: model parallelism, layer parallelism, and data parallelism (and combinations thereof). In model parallelism, each node computes only some parameters of the model, and nodes intercommunicate to exchange parameters. In layer parallelism, each node receives inputs, computes parameters for a particular layer, and provides outputs of that layer to another node. In data parallelism, each node trains a full CM on respective, different data, and the parameter updates (e.g., gradients) are merged to determine how to update the model. Some examples of process 900 provide data-parallel training to determine CM 622.

Figure 10:
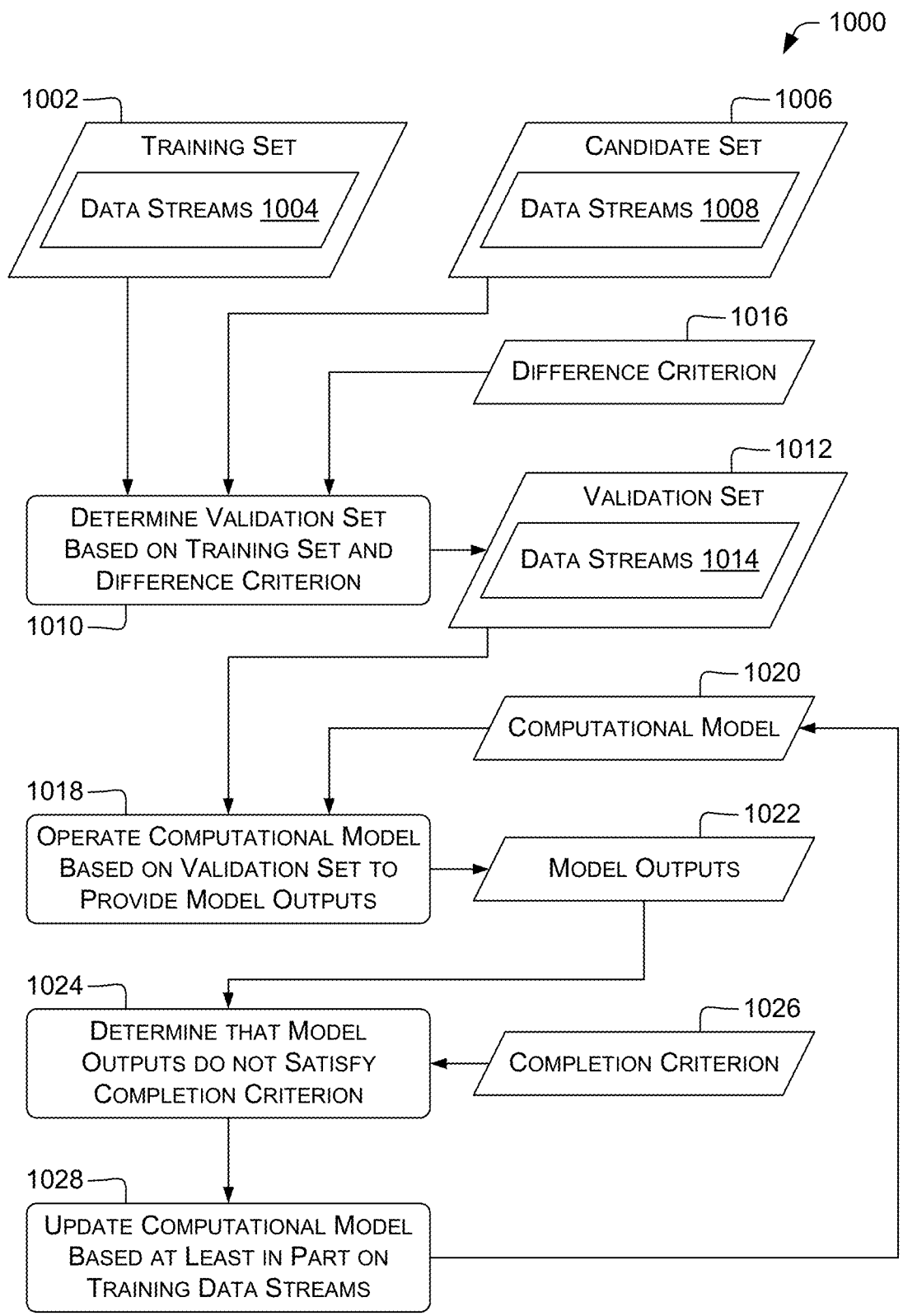
FIG. 10 is a dataflow diagram that illustrates example processes for updating computational model(s) according to various examples described herein.

FIG. 10 is a dataflow diagram that illustrates an example process 1000 for determining and operating computational model(s), and related dataflow. Process 1000 can be carried out, e.g., under control of at least one processing unit 210. Process 1000 can take as input a training set 1002 including data streams 1004 and a candidate set 1006 including data streams 1008. Data streams 1004 and 1008 can represent training data streams 114, FIG. 1.

In some examples, at operation 1010, the preparation module 224 determines a validation set 1012 of data streams 1014 from the candidate set 1006 of data streams 1008 based at least in part on the training set 1002 of data streams 1004 and on a predetermined difference criterion 1016 between data streams. Examples are discussed herein, e.g., with reference to operations 306, 406, or 608, or predetermined difference criterion 316. In some examples, the preparation module 224 can select for inclusion in the validation set 1012 data streams 1008 that satisfy the predetermined difference criterion 1016 with respect to at least one, some, a majority of, or all of the data streams 1004 of the training set 1002. The training set 1002 can be a subset of the candidate set 1006, or can be disjoint from the candidate set 1006, in some examples. In some examples, the training set 1002 and the determined validation set 1012 can be disjoint, although this is not required. In some examples, the training set 1002 comprises or consists of at least some, but fewer than all, of the data streams 1008 of the candidate set 1008.

In some examples, operation 1010 can include determining LSH values, performing other hash-based similarity analysis, or comparing malware family names derived using conventional anti-virus signatures, e.g., as discussed herein with reference to FIG. 4 or 5. In some examples, operation 1010 can include one-to-many or many-to-many sets of pairwise comparisons to determine similarity. In some examples, whether hashing or pairwise comparisons, data streams 1008 are not selected for inclusion in the validation set 1012 if they are similar to data streams 1004 of the training set 1002.

In some examples, at operation 1018, the training module 226 (or the operation module 228, and likewise throughout the following operations of process 800) can operate a computational model (CM) 1020, which can represent CM 220, based at least in part on data stream(s) 1014 of the validation set 1012 to provide respective model output(s) 1022. Examples are discussed herein, e.g., with reference to operations 320 or 808.

In some examples, at operation 1024, the training module 226 determines that the model output(s) 1022 do not satisfy a predetermined completion criterion 1026. Examples are discussed herein, e.g., with reference to operations 410 and 812. In response, operation 1024 can be followed by operation 1028.

In some examples, at operation 1028, the training module 226 updates the CM 1020 based at least in part on data stream(s) 1004 of the training set 1002. For example, the training module 226 can run the next training epoch in a sequence of epochs, or can perform training with different hyperparameter values, as described herein. Examples are discussed herein, e.g., with reference to operations 414 and 814. In some examples, operation 1028 can be followed by operation 1018. This can permit iteratively training the CM 1020, e.g., using mathematical-optimization techniques.

In some examples, operation 1028 can include, before updating the CM 1020, packing the training set 1002 of data streams 1004 in a processor-accessible memory 212. Packing can include any data rearrangement to increase locality, e.g., defragmenting the data streams 1004 in memory, arranging them on successive cache lines for improved prefetch, or other techniques. Locality can also be increased in the CM 1020, which can speed operation of the CM 1020. In some examples, e.g., using hashing (e.g., LSH) or other signatures, a decision-forest CM 1020 can be determined so that each decision tree in the forest is associated with a bin of signatures (e.g., of hash codes thereof). This can permit operating the decision forest using parameters having increased locality for any particular trial data stream 116. This can additionally or alternatively permit loading into memory fewer than all of the parameters of the decision forest by only loading parameters relevant to a particular trial data stream 116, which can increase data-cache locality of the parameters and speed operation of the CM 1020. Techniques in this paragraph and similar techniques can additionally or alternatively permit reducing the memory bandwidth or network bandwidth used during training of the CM 1020.

Figure 11:
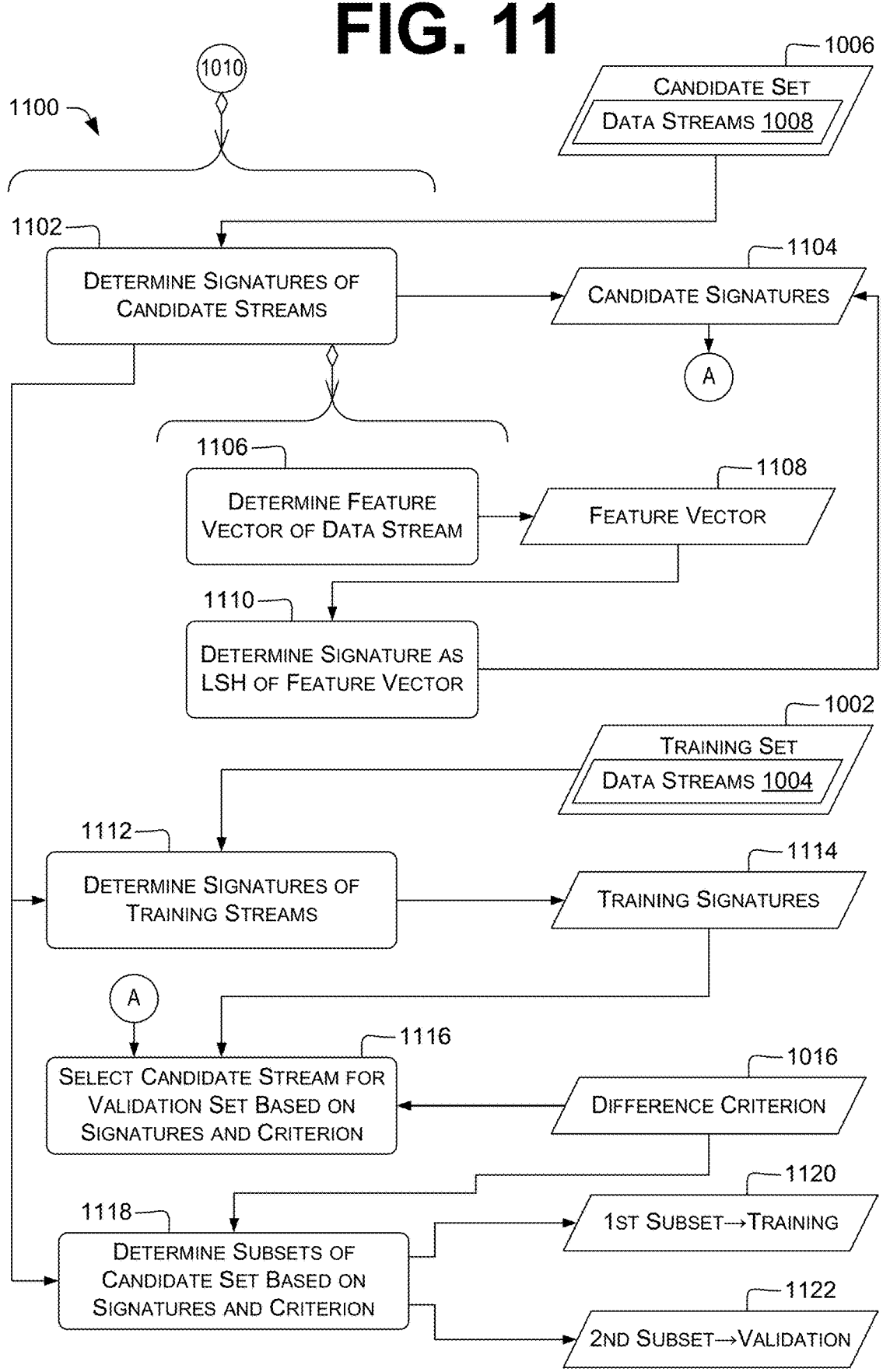
FIG. 11 is a dataflow diagram that illustrates example processes for determining training or validation data for training a computational model according to various examples described herein.

FIG. 11 is a dataflow diagram that illustrates an example process 1100 for determining and operating CM(s), and related dataflow. In some examples, operation 1010 can include operations 1102, 1112, and 1116. In some examples, process 1100 can include determining the training set 1002 and the validation set 1012 in a coordinated manner, e.g., as discussed below with reference to operation 1118.

In some examples, the predetermined difference criterion 1016 applies to at least two signatures and is satisfied by the at least two signatures having at least a predetermined threshold difference. The predetermined threshold difference can be inequality, a difference in magnitude of at least (or exceeding) a threshold, a Hamming distance or other distance measure of at least (or exceeding) a threshold, or another difference threshold.

In some examples, at operation 1102, the preparation module 224 determines respective signatures 1104, which can represent signatures 304, of at least some data streams 1008 of the candidate set 1006. Examples are discussed herein, e.g., with reference to operations 402, 604, or 902. Operation 1102 can be followed by operation 1112 or operation 1118. In some examples, operation 1102 includes operations 1106 and 1110.

In some examples, at operation 1106, the preparation module 224 determines a feature vector 1108 associated with a first data stream 1008 of the candidate set 1006. Examples are discussed herein, e.g., with reference to operation 502 or feature vectors 504.

In some examples, at operation 1110, the preparation module 224 determines the respective signature 1104 of the first data stream 1008 as a locality-sensitive hash (LSH) of the feature vector 1108. Examples are discussed herein, e.g., with reference to operations 402 or 510 or signatures 304. In some examples using sparse LSH techniques, operation 1110 can include determining sparse LSH weight vectors and determining the respective signature 1104 of the first data stream as a locality-sensitive hash (LSH) of the feature vector 1108 based at least in part on the sparse LSH weight vectors. Examples are discussed herein, e.g., with reference to operation 510.

In some examples, at operation 1112, the preparation module 224 determines respective signatures 1114, which can represent signatures 304, of at least some data streams 1004 of the training set 1002. Examples are discussed herein, e.g., with reference to operations 402, 604, or 902. For example, signatures 1114 can be determined as discussed herein with reference to signatures 1104.

In some examples, at operation 1116, the preparation module 224 selects a first data stream 1008 (or at least one data stream) of the candidate set 1006 for inclusion in the validation set 1012 in response to the respective signature 1104 of the first data stream 1008 satisfying the predetermined difference criterion 1016 with respect to the respective signature 1114 of at least one data stream 1004 of the training set 1002. Examples are discussed herein, e.g., with reference to FIG. 4. For example, the first data stream 1008 can be selected further based at least in part on the first data stream 1008 satisfying the predetermined difference criterion 1016 with respect to a majority of, or all of, or at least a predetermined number or percentage of, the respective signatures 1114 of the data streams 1004 of the training set 1002.

In some examples, at operation 1118, the preparation module 224 determines a first subset 1120 of the candidate set 1006 and a second subset 1122 of the candidate set 1006 based at least in part on at least some of the signatures 1104 and on the predetermined difference criterion 1016. Examples are discussed herein, e.g., with reference to the preparation module 224. For example, the preparation module 224 can cluster data streams 1008 of the candidate set 1006 into the first subset 1120 and the second subset 1122 based on the signatures 1104 of those data streams 1008. The preparation module 224 can then determine the training set 1002 comprising or consisting of the first subset 1120 and the validation set 1012 comprising or consisting of the second subset 1122. Determining the subsets 1120 and 1122 in a coordinated manner can permit more effectively determining a validation set 1012 having desired characteristics, e.g., as discussed herein with reference to operation 1010. In some examples, the signatures include locality-sensitive hash values, e.g., as discussed herein with reference to operation 1110.

Figure 12:
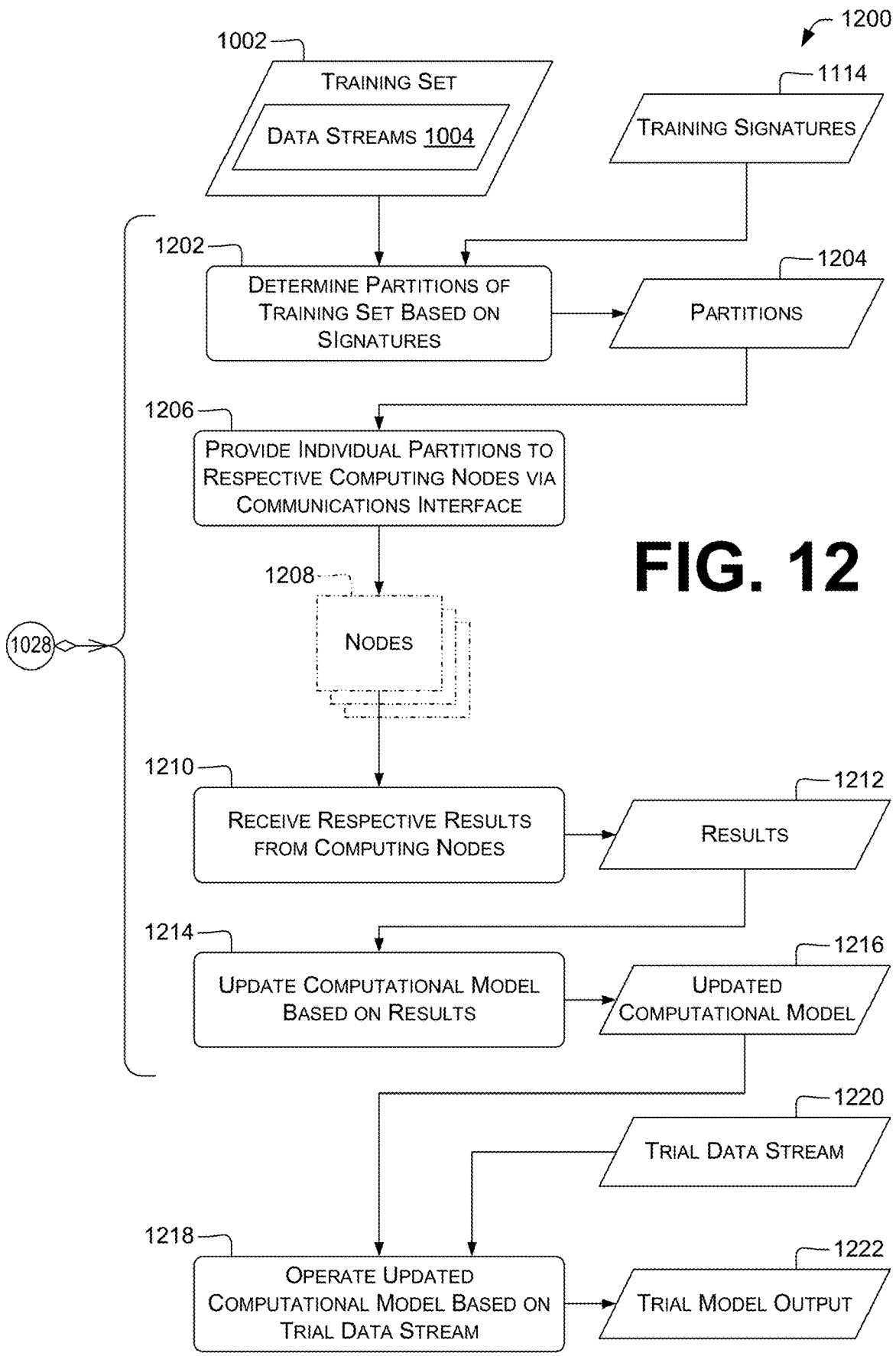
FIG. 12 is a dataflow diagram that illustrates example processes for updating or operation computational model(s), e.g., using multi-node update processing, according to various examples described herein.

FIG. 12 is a dataflow diagram that illustrates an example process 1200 for determining CM(s), and related dataflow. In some examples, operation 1028 can include operations 1202, 1206, 1210, or 1214. In some examples, operation 1028 or operation 1214 can be followed by operation 1218.

In some examples, at operation 1202, the training module 226 (or the preparation module 224 or the operation module 228, and likewise throughout the following discussion of operations 1202-1214) determines a plurality of partitions 1204 of the training set 1002 based at least in part on the signatures 1114. Each partition 1204 of the plurality of partitions 1204 can include or consist of at least one of the data streams 1004 of the training set 1002. Examples are discussed herein, e.g., with reference to operation 902 and partitions 904.

In some examples, at operation 1206, the training module 226 provides individual partitions 1204 of the plurality of partitions 1204 to respective computing nodes 1208 of a plurality of computing nodes 1208 via a communications interface 232 communicatively connected with the processing unit(s) 210. Examples are discussed herein, e.g., with reference to operation 910 and nodes 912.

In some examples, at operation 1210, the training module 226 receives respective results 1212 from individual computing nodes 1208 of the plurality of computing nodes 1208. Examples are discussed herein, e.g., with reference to operation 916, nodes 912, and results 918.

In some examples, at operation 1214, the training module 226 updates the CM 1020 based at least in part on the results 1212 to provide updated CM 1216. Examples are discussed herein, e.g., with reference to operations 414, 814, 920, and 1028.

In some examples, at operation 1218, the operation module 228 operates the CM 1020 based at least in part on at least one trial data stream 1220 to provide a trial model output 1222. The trial model output 1222 can indicate whether the trial data stream 1220 is associated with malware. Examples are discussed herein, e.g., with reference to operation 320 and trial model output 322.

EXAMPLE CLAUSES

A: A method comprising, under control of at least one processing unit: determining respective signatures of individual training data streams of a plurality of training data streams; determining, based at least in part on the signatures and a predetermined difference criterion, a training set comprising at least some of the plurality of training data streams and a validation set comprising at least some of the plurality of training data streams; determining a computational model based at least in part on the training set; and operating the computational model based at least in part on a trial data stream to provide a trial model output.

B: The method according to claim A, wherein the trial model output indicates whether the trial data stream is associated with malware.

C: The method according to claim A, wherein at least one of the plurality of training data streams comprises at least part of an executable file.

D: The method according to claim A, further comprising: determining the computational model by performing a supervised learning process using at least one training stream of the training set as training data; testing the computational model based at least in part on at least one validation stream of the validation set; and selectively updating the computational model based at least in part on a result of the testing.

E: The method according to claim D, wherein the computational model comprises at least one of: a neural network, a decision tree, or a tree ensemble.

F: The method according to claim A, further comprising determining the signatures as locality-sensitive hash (LSH) values associated with the respective training data streams.

G: The method according to claim F, further comprising: determining respective feature vectors of the individual training data streams; and determining the signatures as the LSH values of the respective feature vectors.

H: The method according to claim A, wherein: the method further comprises determining the validation set including validation streams of the plurality of training data streams that satisfy the predetermined difference criterion with respect to training stream(s) in the training set; and the predetermined difference criterion is defined with respect to the signatures.

I: The method according to claim A, further comprising: determining respective feature vectors of the individual training data streams; and determining the signatures based on the respective feature vectors.

J: The method according to claim A, further comprising determining at least one of the signatures as a hash of at least a portion of the respective training data stream.

K: The method according to claim A, further comprising: determining respective feature vectors of the individual training data streams; determining sparse LSH weight vectors; and determining the signatures as the LSH values of the respective feature vectors based at least in part on the sparse LSH weight vectors.

L: The method according to claim A, further comprising: determining a plurality of partitions of the training set based at least in part on the signatures, wherein each partition of the plurality of partitions comprises at least one of the data streams of the training set; providing individual partitions of the plurality of partitions to respective computing nodes of a plurality of computing nodes via a communications interface communicatively connected with the processor; receiving respective results from individual computing nodes of the plurality of computing nodes; and determining the computational model based at least in part on the results.

M: A method comprising, under control of at least one processing unit: determining signatures of respective data streams; determining, based at least in part on the signatures, a training set comprising at least one of the data streams and a validation set comprising at least one of the data streams, wherein the respective signatures of a first data stream of the training set and a second data stream of the validation set satisfy a predetermined difference criterion; and determining a computational model based at least in part on the training set.

N: The method according to claim M, further comprising: determining respective feature vectors of at least some of the data streams; and determining the signatures comprising locality-sensitive hash (LSH) values of the respective feature vectors.

O: The method according to claim M, further comprising determining the signatures comprising respective dissimilarity values between the respective data streams and a common reference data stream of the data streams.

P: The method according to claim O, further comprising determining the signatures further comprising respective second dissimilarity values between the respective data streams and a common second reference data stream of the data streams.

Q: The method according to claim O, wherein at least one dissimilarity value comprises at least one of a Euclidean distance, an angular distance, or a Hamming distance.

R: The method according to claim M, further comprising: determining the computational model further based at least in part on a first hyperparameter value; operating the computational model based at least in part on at least some of the data streams of the validation set to provide respective model outputs; determining that the model outputs do not satisfy a predetermined completion criterion; and, in response, determining a second computational model based at least in part on the training set and a second, different hyperparameter value.

S: The method according to claim R, further comprising determining the second hyperparameter value based at least in part on at least one of: the first hyperparameter value; or at least one of the model outputs.

T: The method according to claim M, further comprising determining the validation set including individual data streams that satisfy the predetermined difference criterion with respect to at least some of the data streams in the training set.

U: The method according to claim M, wherein the training set is disjoint from the validation set.

V: The method according to claim M, further comprising: determining a plurality of partitions of the training set based at least in part on the signatures, wherein each partition of the plurality of partitions comprises at least one of the data streams of the training set; providing individual partitions of the plurality of partitions to respective computing nodes of a plurality of computing nodes via a communications interface communicatively connected with the processing unit; receiving respective results from individual computing nodes of the plurality of computing nodes; and determining the computational model based at least in part on the results.

W: The method according to claim V, further comprising determining a first partition of the plurality of partitions based at least in part on a predetermined similarity criterion, wherein the respective signatures of a majority of the data streams in the first partition satisfy the predetermined similarity criterion with respect to each other.

X: The method according to claim V, further comprising determining a first partition of the plurality of partitions based at least in part on a predetermined similarity criterion, wherein, for any majority of the data streams in the first partition, the respective signatures of the data streams in the majority do not satisfy the predetermined similarity criterion with respect to each other.

Y: The method according to claim V, wherein the providing comprises transmitting data of at least some of the individual partitions to the respective computing nodes via a network interface.

Z: The method according to claim M, further comprising: determining respective feature vectors of at least some of the data streams; determining sparse LSH weight vectors; and determining the signatures as the LSH values of the respective feature vectors based at least in part on the sparse LSH weight vectors.

AA: The method according to claim M, wherein the computational model comprises at least one of a neural network (NN), a decision tree, or a tree ensemble.

AB: The method according to claim M, further comprising, before determining the computational model, arranging the training set and the validation set in respective, different regions of a computer memory communicatively connected with the processor.

AC: A method comprising, under control of at least one processing unit: determining a validation set of data streams from a candidate set of data streams based at least in part on a training set of data streams and on a predetermined difference criterion between data streams; and operating a computational model based at least in part on data stream(s) of the validation set to provide respective model output(s); determining that the model output(s) do not satisfy a predetermined completion criterion; and, in response, updating the computational model based at least in part on data stream(s) of the training set to provide an updated computational model.

AD: The method according to claim AC, wherein: the predetermined difference criterion applies to at least two signatures and is satisfied by the at least two signatures having at least a predetermined threshold difference; and the method further comprises: determining respective signatures of at least some data streams of the candidate set; determining respective signatures of at least some data streams of the training set; and selecting a first data stream of the candidate set for inclusion in the validation set in response to the respective signature of the first data stream satisfying the predetermined difference criterion with respect to the respective signature of at least one data stream of the training set.

AE: The method according to claim AD, further comprising: determining a feature vector associated with the first data stream; and determining the respective signature of the first data stream as a locality-sensitive hash (LSH) of the feature vector.

AF: The method according to claim AD, further comprising selecting the first data stream further based at least in part on the first data stream satisfying the predetermined difference criterion with respect to a majority of the respective signatures of the data streams of the training set.

AG: The method according to claim AD, further comprising: determining a feature vector associated with the first data stream; determining sparse LSH weight vectors; and determining the respective signature of the first data stream as a locality-sensitive hash (LSH) of the feature vector based at least in part on the sparse LSH weight vectors.

AH: The method according to claim AC, further comprising: determining respective signatures of at least some data streams of the candidate set; determining a first subset of the candidate set and a second subset of the candidate set based at least in part on at least some of the signatures and on the predetermined difference criterion; determining the training set comprising the first subset; and determining the validation set comprising the second subset.

AI: The method according to claim AH, wherein the training set and the validation set are disjoint.

AJ: The method according to claim AC, further comprising: determining a plurality of partitions of the training set based at least in part on the signatures, wherein each partition of the plurality of partitions comprises at least one of the data streams of the training set; providing individual partitions of the plurality of partitions to respective computing nodes of a plurality of computing nodes via a communications interface communicatively connected with the at least one processing unit; receiving respective results from individual computing nodes of the plurality of computing nodes; and updating the computational model based at least in part on the results.

AK: The method according to claim AC, further comprising: operating the updated computational model based at least in part on at least one trial data stream to provide a trial model output indicating whether the trial data stream is associated with malware.

AL: The method according to claim AC, wherein: the training set comprises at least some, but fewer than all, of the data streams of the candidate set; and the method further comprises, before updating the computational model, packing the training set of data streams in a processor-accessible memory.

AM: A computer-readable medium, e.g., a computer storage medium, having thereon computer-executable instructions, the computer-executable instructions upon execution configuring a computer to perform operations as any of paragraphs A-AL (e.g., A-L, M-AB, or AC-AL) recites.

AN: A device comprising: a processor; and a computer-readable medium, e.g., a computer storage medium, having thereon computer-executable instructions, the computer-executable instructions upon execution by the processor configuring the device to perform operations as any of paragraphs A-AL (e.g., A-L, M-AB, or AC-AL) recites.

AO: A system comprising: means for processing; and means for storing having thereon computer-executable instructions, the computer-executable instructions including means to configure the system to carry out a method as any of paragraphs A-AL (e.g., A-L, M-AB, or AC-AL) recites.

CONCLUSION

Various computational-model determination and operation techniques described herein can permit more efficiently analyzing data, e.g., of a data stream, and more readily determining a signature or classification of the data stream. Various examples can reduce the time or memory requirements of software to determine signatures or classifications while maintaining or improving the accuracy of such determinations. Some examples herein permit classifying data streams unknown at the time of training, e.g., malware generated using a custom packer specific to that type of malware or the relevant adversary. Some examples provide signatures that can then be used by neural networks or other classifiers in determining classifications of unknown files. Some examples herein can provide improved accuracy of classification of malware within a malware family or across families. This can, in turn, permit more readily detecting and disabling newly-developed malware variants, e.g., polymorphic malware. Some examples are described with reference to malware, but techniques described herein are not limited to files associated with malware. For example, techniques used herein can be used to classify media files (e.g., audio, video, or image); productivity files (e.g., text documents or spreadsheets); data files (e.g., database indexes or tables); or other types of files.

Various examples herein can be used with a variety of types of data streams, including data streams that have been compiled or linked, assembled into distribution packages or script packages, combined into self-extractors or self-installers, packed, or encrypted, e.g., for content protection. Example trial data streams 116 that can be analyzed using computational models 112 as described herein include, but are not limited to, PE, ELF, Mach-O, JAR, or DEX executables, or any other executable formats; PNG, GIF, or other image formats; OGG, MP3, MP4, Matroska, or other audio or video container or bitstream formats; or traces of network traffic, e.g., headers or bodies of data packets in protocols such as IEEE 802.11, IP, UDP, or TCP. Example types of trial data streams 116 that can be analyzed using computational models 112 as described herein include, but are not limited to, executables, static libraries, dynamic libraries, data files, compressed files, encrypted files, or obfuscated files.

Although the techniques have been described in language specific to structural features and/or methodological acts, it is to be understood that the appended claims are not necessarily limited to the features and/or acts described. Rather, the features and acts are described as example implementations of such techniques. For example, network 108, processing unit(s) 210, and other structures described herein for which multiple types of implementing devices or structures are listed can include any of the listed types, and/or multiples and/or combinations thereof.

The operations of the example processes are illustrated in individual operations and summarized with reference to those operations. The processes are illustrated as logical flows of operations, each operation of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 102, 104, and/or 200 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more computers and/or processors. The code modules can be embodied in any type of computer-readable medium. Some and/or all of the methods can be embodied in specialized computer hardware. As used herein, the term "module" is intended to represent example divisions of the described operations (e.g., implemented in software or hardware) for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware (e.g., as an ASIC, a specialized processing unit, etc.) to execute the described functions. In some instances, the functionality and/or modules discussed herein may be implemented as part of the operating system 216. In other instances, the functionality and/or modules may be implemented as part of a device driver, firmware, and so on.

The word "or" and the phrase "and/or" are used herein in an inclusive sense unless specifically stated otherwise. Accordingly, conjunctive language such as the phrases "X, Y, or Z," "at least X, Y, or Z," or "at least one of X, Y or Z," unless specifically stated otherwise, is to be understood as signifying that an item, term, etc., can be either X, Y, or Z, or a combination thereof. Conditional language such as, among others, "can," "could," "might" and/or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example.

Any routine descriptions, elements and/or blocks in the flow diagrams described herein and/or depicted in the attached figures should be understood as potentially representing modules, segments, and/or portions of code that include one or more computer-executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. Examples herein are nonlimiting unless expressly stated otherwise, regardless of whether or not they are explicitly described as being nonlimiting. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise.

What is claimed is:

1. A method comprising, under control of at least one processing unit:
   determining a validation set of data streams from a candidate set of data streams based at least in part on a training set of data streams and on a predetermined difference criterion between an individual data stream of the candidate set and an individual data stream of the training set; and
   operating a computational model based at least in part on one or more data streams of the validation set to provide one or more respective model outputs;
   determining that the one or more respective model output do not satisfy a predetermined completion criterion; and, in response,
   updating the computational model based at least in part on one or more data streams of the training set to provide an updated computational model,
   wherein the predetermined difference criterion applies to a first signature associated with the candidate set and a second signature associated with the training set, respectively, and is satisfied by the first signature and the second signature having at least a predetermined threshold difference.

2. The method according to claim 1, further comprising:
   determining respective signatures of at least some data streams of the candidate set;
   determining respective signatures of at least some data streams of the training set; and
   selecting a first data stream of the candidate set for inclusion in the validation set in response to the respective signature of the first data stream satisfying the predetermined difference criterion with respect to the respective signature of at least one data stream of the training set.

3. The method according to claim 2, further comprising:
   determining a feature vector associated with the first data stream; and determining the respective signature of the first data stream as a locality-sensitive hash (LSH) of the feature vector.

4. The method according to claim 2, further comprising selecting the first data stream further based at least in part on the first data stream satisfying the predetermined difference criterion with respect to a majority of the respective signatures of the data streams of the training set.

5. The method according to claim 2, further comprising:
determining a plurality of partitions of the training set based at least in part on the respective signatures, wherein each partition of the plurality of partitions comprises at least one of the data streams of the training set;
providing individual partitions of the plurality of partitions to respective computing nodes of a plurality of computing nodes via a communications interface communicatively connected with the at least one processing unit;
receiving respective results from individual computing nodes of the plurality of computing nodes; and
updating the computational model based at least in part on the results.

6. The method according to claim 1, further comprising:
determining respective signatures of at least some data streams of the candidate set;
determining a first subset of the candidate set and a second subset of the candidate set based at least in part on at least some of the respective signatures and on the predetermined difference criterion;
determining the training set comprising the first subset; and
determining the validation set comprising the second subset.

7. The method according to claim 1, further comprising:
operating the updated computational model based at least in part on at least one trial data stream to provide a trial model output indicating whether the trial data stream is associated with malware.

8. A system comprising:
one or more processors; and
memory communicatively coupled to the one or more processors, the memory storing instructions executable by the one or more processors that, when executed by the one or more processors, cause the system to perform operations including:
determining a validation set of data streams from a candidate set of data streams based at least in part on a training set of data streams and on a predetermined difference criterion between an individual data stream of the candidate set and an individual data stream of the training set; and
operating a computational model based at least in part on one or more data streams of the validation set to provide one or more respective model outputs;
determining that the one or more respective model outputs do not satisfy a predetermined completion criterion; and, in response,
updating the computational model based at least in part on the one or more data streams of the training set to provide an updated computational model,
wherein the predetermined difference criterion applies to a first signature associated with the candidate set and a second signature associated with the training set, respectively, and is satisfied by the first signature and the second signature having at least a predetermined threshold difference.

9. The system according to claim 8, wherein:
the instructions, when executed by the one or more processors, cause the system to perform operations further including:
determining respective signatures of at least some data streams of the candidate set;
determining respective signatures of at least some data streams of the training set; and
selecting a first data stream of the candidate set for inclusion in the validation set in response to the respective signature of the first data stream satisfying the predetermined difference criterion with respect to the respective signature of at least one data stream of the training set.

10. The system according to claim 9, wherein the instructions, when executed by the one or more processors, cause the system to perform operations further including:
determining a feature vector associated with the first data stream; and
determining the respective signature of the first data stream as a locality-sensitive hash (LSH) of the feature vector.

11. The system according to claim 9, wherein the instructions, when executed by the one or more processors, cause the system to perform operations further including:
selecting the first data stream further based at least in part on the first data stream satisfying the predetermined difference criterion with respect to a majority of the respective signatures of the data streams of the training set.

12. The system according to claim 9, wherein the instructions, when executed by the one or more processors, cause the system to perform operations further including:
determining a plurality of partitions of the training set based at least in part on the respective signatures, wherein each partition of the plurality of partitions comprises at least one of the data streams of the training set;
providing individual partitions of the plurality of partitions to respective computing nodes of a plurality of computing nodes via a communications interface communicatively connected with the at least one processing unit;
receiving respective results from individual computing nodes of the plurality of computing nodes; and
updating the computational model based at least in part on the results.

13. The system according to claim 8, wherein the instructions, when executed by the one or more processors, cause the system to perform operations further including:
determining respective signatures of at least some data streams of the candidate set;
determining a first subset of the candidate set and a second subset of the candidate set based at least in part on at least some of the respective signatures and on the predetermined difference criterion;
determining the training set comprising the first subset; and
determining the validation set comprising the second subset.

14. The system according to claim 8, wherein the instructions, when executed by the one or more processors, cause the system to perform operations further including:
operating the updated computational model based at least in part on at least one trial data stream to provide a trial model output indicating whether the trial data stream is associated with malware.

15. A non-transitory computer-readable storage medium storing computer-readable instructions executable by one or more processors, that when executed by the one or more processors, cause the one or more processors to perform operations comprising:
  determining a validation set of data streams from a candidate set of data streams based at least in part on a training set of data streams and on a predetermined difference criterion between an individual data stream of the candidate set and an individual data stream of the training set; and
  operating a computational model based at least in part on one or more data streams of the validation set to provide one or more respective model outputs;
  determining that the one or more respective model outputs do not satisfy a predetermined completion criterion; and, in response,
  updating the computational model based at least in part on one or more data streams of the training set to provide an updated computational model,
  wherein the predetermined difference criterion applies to a first signature associated with the candidate set and a second signature associated with the training set, respectively, and is satisfied by the first signature and the second signature having at least a predetermined threshold difference.

16. The non-transitory computer-readable storage medium according to claim 15, wherein:
  the instructions, when executed by the one or more processors, cause the one or more processors to perform operations further including:
  determining respective signatures of at least some data streams of the candidate set;
  determining respective signatures of at least some data streams of the training set; and
  selecting a first data stream of the candidate set for inclusion in the validation set in response to the respective signature of the first data stream satisfying the predetermined difference criterion with respect to the respective signature of at least one data stream of the training set.

17. The non-transitory computer-readable storage medium according to claim 16, wherein the instructions, when executed by the one or more processors, cause the one or more processors to perform operations further including:
  determining a feature vector associated with the first data stream; and
  determining the respective signature of the first data stream as a locality-sensitive hash (LSH) of the feature vector.

18. The non-transitory computer-readable storage medium according to claim 16, wherein the instructions, when executed by the one or more processors, cause the one or more processors to perform operations further including:
  selecting the first data stream further based at least in part on the first data stream satisfying the predetermined difference criterion with respect to a majority of the respective signatures of the data streams of the training set.

19. The non-transitory computer-readable storage medium according to claim 16, wherein the instructions, when executed by the one or more processors, cause the one or more processors to perform operations further including:
  determining a plurality of partitions of the training set based at least in part on the respective signatures, wherein each partition of the plurality of partitions comprises at least one of the data streams of the training set;
  providing individual partitions of the plurality of partitions to respective computing nodes of a plurality of computing nodes via a communications interface communicatively connected with the at least one processing unit;
  receiving respective results from individual computing nodes of the plurality of computing nodes; and
  updating the computational model based at least in part on the results.

20. The non-transitory computer-readable storage medium according to claim 15, wherein the instructions, when executed by the one or more processors, cause the one or more processors to perform operations further including:
  determining respective signatures of at least some data streams of the candidate set;
  determining a first subset of the candidate set and a second subset of the candidate set based at least in part on at least some of the respective signatures and on the predetermined difference criterion;
  determining the training set comprising the first subset; and
  determining the validation set comprising the second subset.

* * * * *